(12) United States Patent
Kang et al.

(10) Patent No.: US 10,372,668 B2
(45) Date of Patent: *Aug. 6, 2019

(54) HARDWARE PROCESSORS AND METHODS FOR TIGHTLY-COUPLED HETEROGENEOUS COMPUTING

(71) Applicant: INTEL CORPORATION, Santa Clara, CA (US)

(72) Inventors: Chang Yong Kang, Chandler, AZ (US); Pierre Laurent, Quin (IE); Hari K. Tadepalli, Gilbert, AZ (US); Prasad M. Ghatigar, Shannon (IE); T.J. O'Dwyer, Cashel (IE); Serge Zhilyaev, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/870,632

(22) Filed: Jan. 12, 2018

(65) Prior Publication Data
US 2018/0225255 A1  Aug. 9, 2018

Related U.S. Application Data

(63) Continuation of application No. 14/752,047, filed on Jun. 26, 2015, now Pat. No. 9,870,339.

(51) Int. Cl.
*G06F 15/80* (2006.01)
*G06F 13/16* (2006.01)
(Continued)

(52) U.S. Cl.
CPC ...... *G06F 15/8061* (2013.01); *G06F 9/30036* (2013.01); *G06F 9/3834* (2013.01);
(Continued)

(58) Field of Classification Search
CPC .. G06F 9/30036; G06F 9/3834; G06F 9/3836; G06F 9/3838; G06F 9/3853;
(Continued)

(56) References Cited

U.S. PATENT DOCUMENTS

| | | | |
|---|---|---|---|
| 5,418,976 A | * | 5/1995 | Iida ........................ G06F 9/3879 712/38 |
| 5,497,467 A | | 3/1996 | Wakui et al. |

(Continued)

FOREIGN PATENT DOCUMENTS

| | | |
|---|---|---|
| JP | 2002149399 A | 5/2002 |
| JP | 2005538439 A | 12/2005 |

(Continued)

OTHER PUBLICATIONS

Decision to Grant from foreign counterpart Japanese Patent Application No. 2016-093449, dated Nov. 20, 2018, 2 pages.

(Continued)

*Primary Examiner* — Daniel H Pan
(74) *Attorney, Agent, or Firm* — Nicholson De Vos Webster & Elliott LLP

(57) ABSTRACT

Methods and apparatuses relating to tightly-coupled heterogeneous computing are described. In one embodiment, a hardware processor includes a plurality of execution units in parallel, a switch to connect inputs of the plurality of execution units to outputs of a first buffer and a plurality of memory banks and connect inputs of the plurality of memory banks and a plurality of second buffers in parallel to outputs of the first buffer, the plurality of memory banks, and the plurality of execution units, and an offload engine with inputs connected to outputs of the plurality of second buffers.

24 Claims, 18 Drawing Sheets

(51) Int. Cl.
  *G06F 13/36* (2006.01)
  *G06F 13/40* (2006.01)
  *G06F 9/312* (2018.01)
  *G06F 9/38* (2018.01)
  *G06F 9/30* (2018.01)

(52) U.S. Cl.
  CPC .......... *G06F 9/3836* (2013.01); *G06F 9/3838* (2013.01); *G06F 9/3853* (2013.01); *G06F 9/3867* (2013.01); *G06F 9/3877* (2013.01); *G06F 13/16* (2013.01); *G06F 9/3814* (2013.01); *G06F 13/4059* (2013.01); *G06F 15/8007* (2013.01); *G06F 15/8084* (2013.01)

(58) Field of Classification Search
  CPC .... G06F 9/3867; G06F 9/3877; G06F 9/3814; G06F 15/8061; G06F 13/16; G06F 13/4059; G06F 15/8007; G06F 15/8084
  USPC ............ 712/2–22, 33–36, 225; 710/305–317
  See application file for complete search history.

(56) References Cited

U.S. PATENT DOCUMENTS

| | | | |
|---|---|---|---|
| 5,522,052 A | 5/1996 | Inoue et al. | |
| 5,623,698 A * | 4/1997 | Stephenson | G06F 15/17393 710/38 |
| 5,740,404 A | 4/1998 | Baji | |
| 5,767,858 A | 6/1998 | Kawase et al. | |
| 6,012,139 A | 1/2000 | Biswas et al. | |
| 6,957,324 B2 * | 10/2005 | Washio | G06F 9/30014 712/225 |
| 8,102,863 B1 * | 1/2012 | Evans | H04L 67/06 370/401 |
| 8,473,657 B2 * | 6/2013 | Zhou | H04L 49/10 710/111 |
| 9,870,339 B2 * | 1/2018 | Kang | G06F 13/16 |
| 2005/0125590 A1 * | 6/2005 | Li | G06F 13/4027 710/317 |
| 2005/0147110 A1 | 7/2005 | Connor | |
| 2010/0198985 A1 * | 8/2010 | Kanevsky | H04L 45/02 709/241 |
| 2013/0311852 A1 | 11/2013 | Zhang et al. | |
| 2015/0006866 A1 | 1/2015 | Gschwind | |

FOREIGN PATENT DOCUMENTS

| | | |
|---|---|---|
| JP | 2008165780 A | 7/2008 |
| JP | 2009026135 A | 2/2009 |
| JP | 2010541088 A | 12/2010 |

OTHER PUBLICATIONS

Extended European Search Report for Application No. 16170882.1, dated Dec. 7, 2016, 4 pages.
Non-Final Office Action from U.S. Appl. No. 14/752,047, dated Apr. 18, 2017, 13 pages.
Notice of Allowance from U.S. Appl. No. 14/752,047, dated Sep. 12, 2017, 12 pages.
Notice of Preliminary Rejection from foreign counterpart Korean Patent Application No. 10-2016-0064890, dated Jul. 26, 2017, 7 pages.
Notification of Reasons for Refusal from foreign counterpart Japanese Patent Application No. 2016-093449, dated Jul. 25, 2017, 7 pages.

* cited by examiner

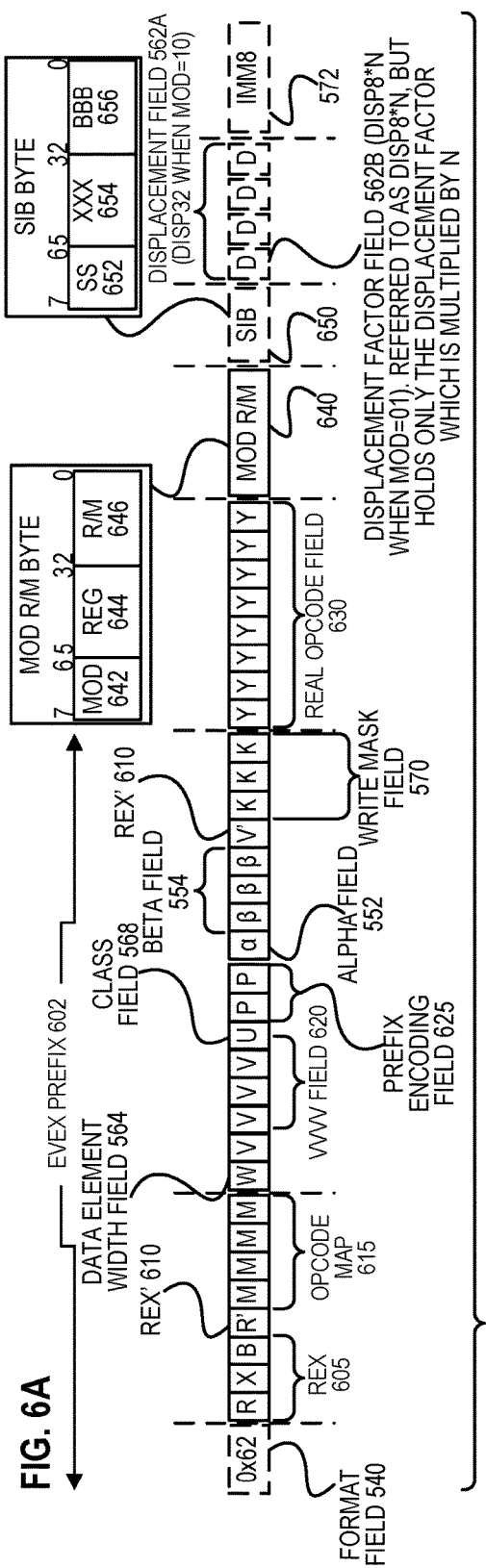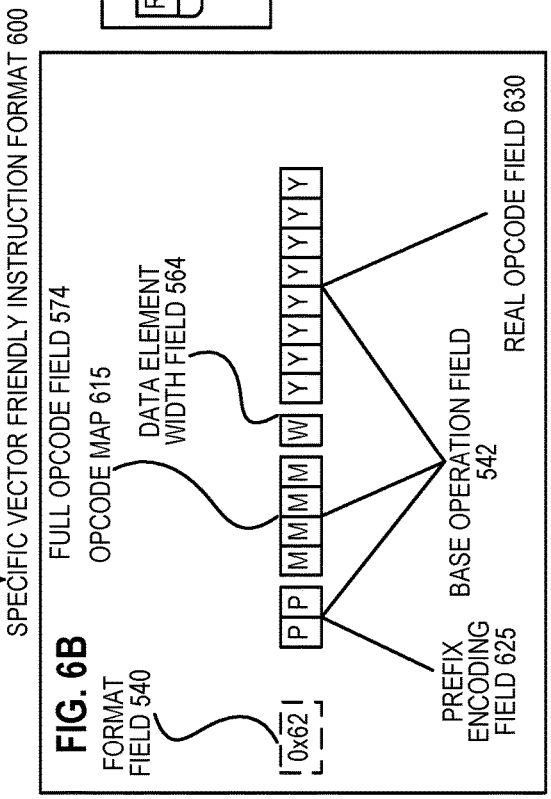

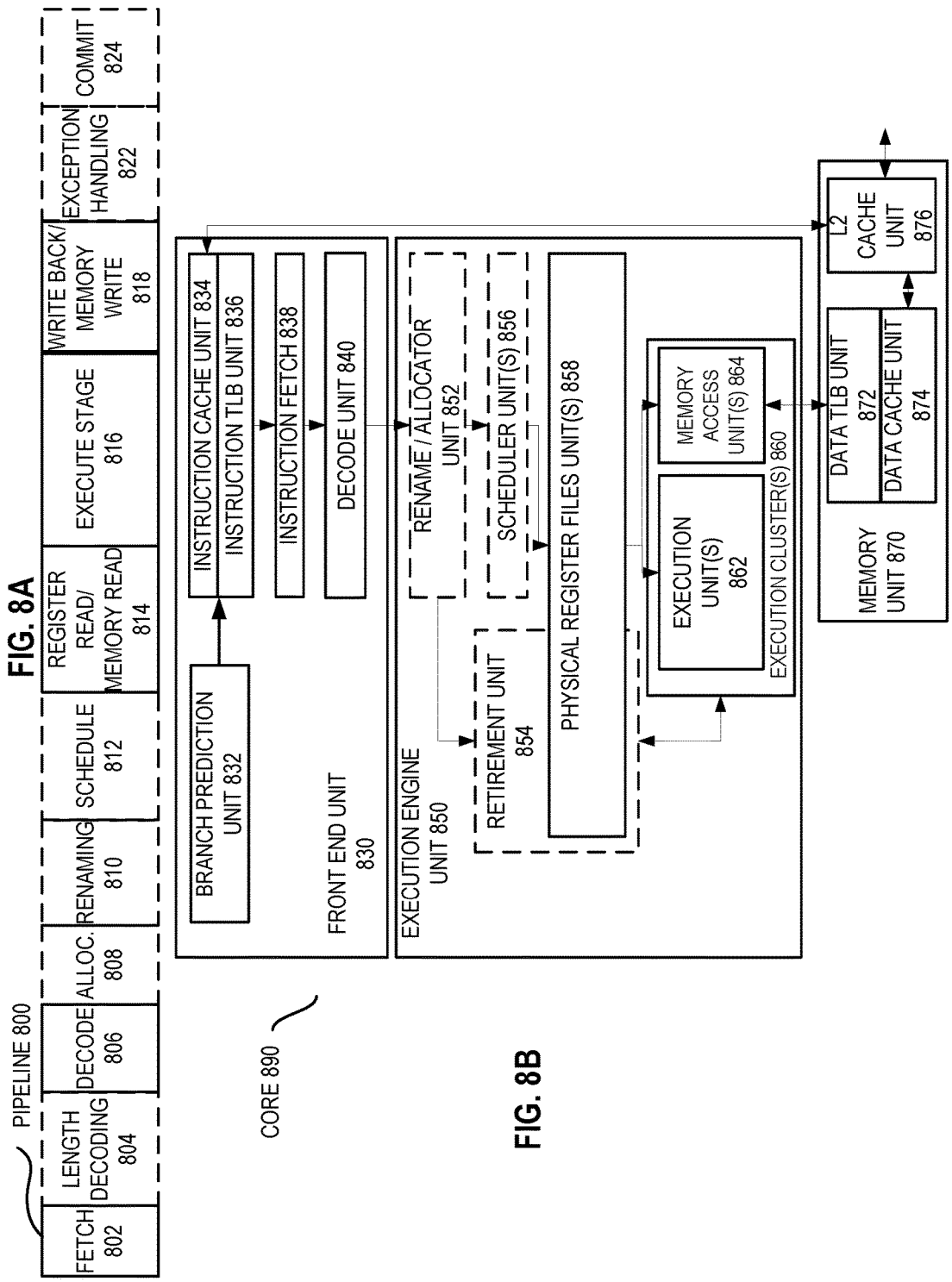

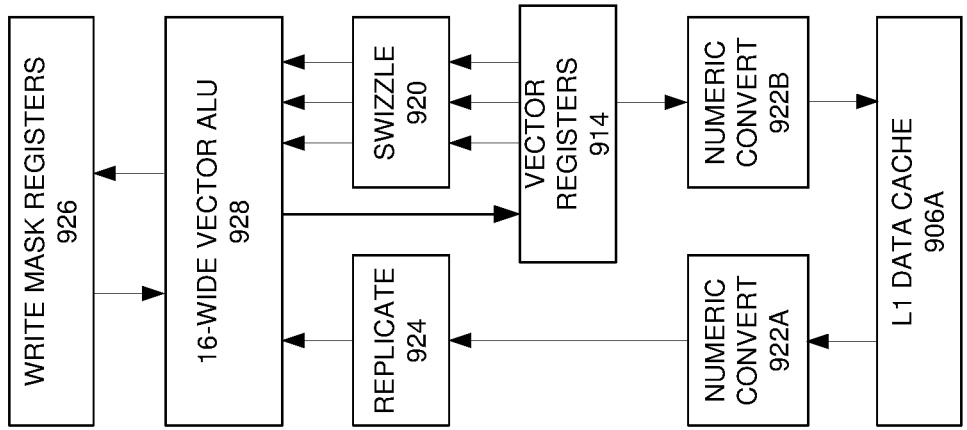
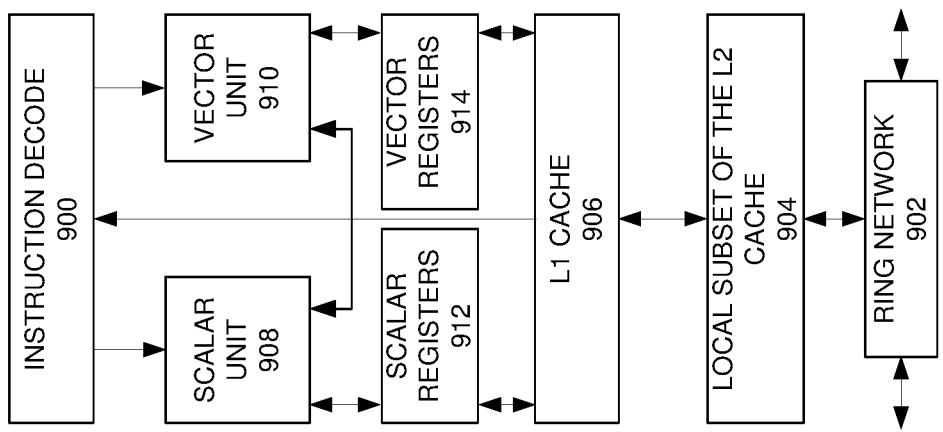

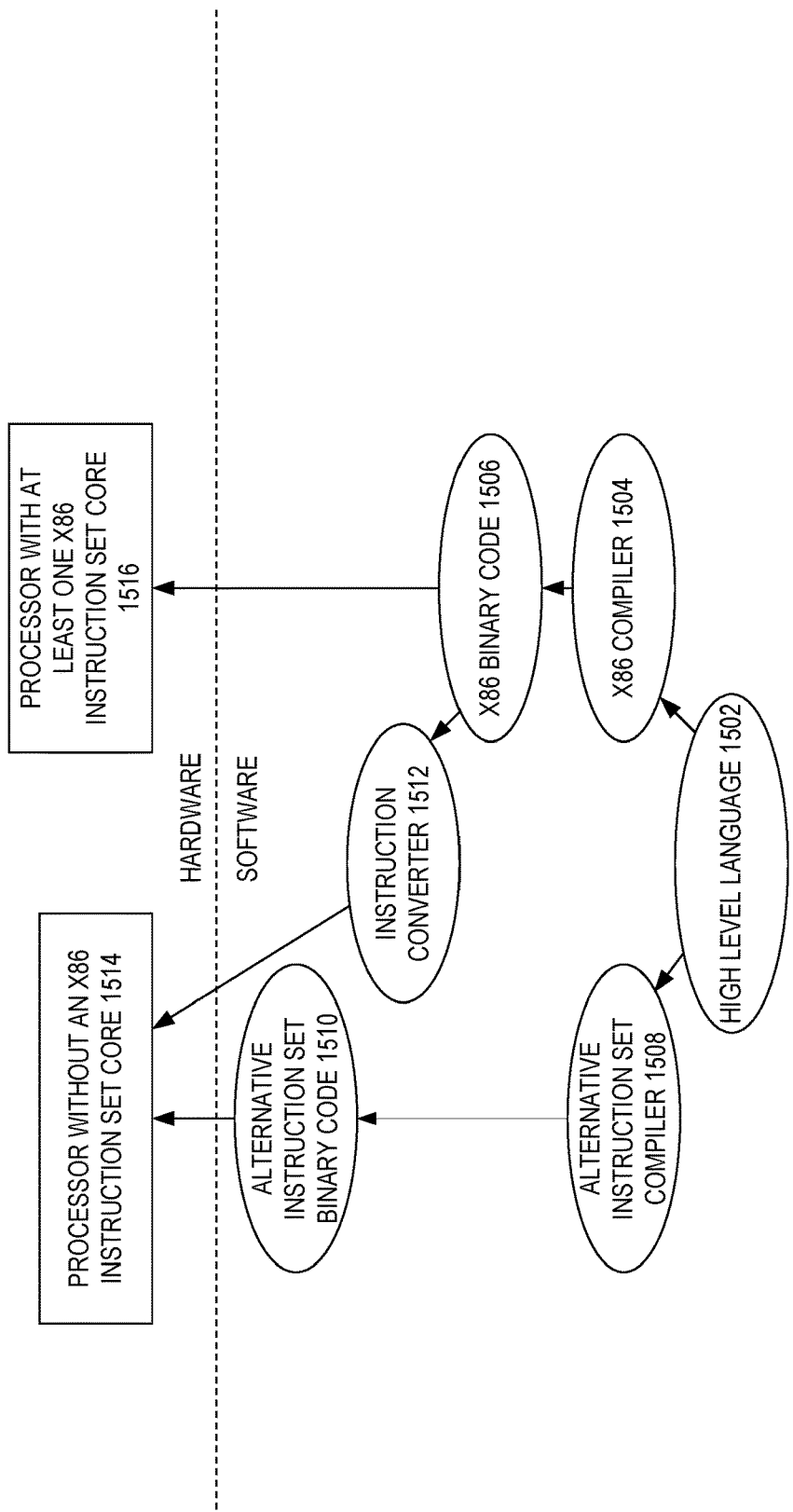

US 10,372,668 B2

HARDWARE PROCESSORS AND METHODS FOR TIGHTLY-COUPLED HETEROGENEOUS COMPUTING

CROSS REFERENCE TO RELATED APPLICATIONS

The present patent application is a continuation application claiming priority from U.S. patent application Ser. No. 14/752,047, filed Jun. 26, 2015, and titled: "Hardware Processors and Methods for Tightly-Coupled Heterogeneous Computing", which is incorporated herein by reference in its entirety.

TECHNICAL FIELD

The disclosure relates generally to electronics, and, more specifically, an embodiment of the disclosure relates to a hardware processor for tightly-coupled heterogeneous computing.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O).

BRIEF DESCRIPTION OF THE DRAWINGS

The present disclosure is illustrated by way of example and not limitation in the figures of the accompanying drawings, in which like references indicate similar elements and in which:

FIG. 6A is a block diagram illustrating fields for the generic vector friendly instruction formats in FIGS. 5A and 5B according to embodiments of the disclosure.

FIG. 6B is a block diagram illustrating the fields of the specific vector friendly instruction format in FIG. 6A that make up a full opcode field according to one embodiment of the disclosure.

FIG. 6C is a block diagram illustrating the fields of the specific vector friendly instruction format in FIG. 6A that make up a register index field according to one embodiment of the disclosure.

FIG. 8A is a block diagram illustrating both an exemplary in-order pipeline and an exemplary register renaming, out-of-order issue/execution pipeline according to embodiments of the disclosure.

FIG. 8B is a block diagram illustrating both an exemplary embodiment of an in-order architecture core and an exemplary register renaming, out-of-order issue/execution architecture core to be included in a processor according to embodiments of the disclosure.

FIG. 9A is a block diagram of a single processor core, along with its connection to the on-die interconnect network and with its local subset of the Level 2 (L2) cache, according to embodiments of the disclosure.

FIG. 9B is an expanded view of part of the processor core in FIG. 9A according to embodiments of the disclosure.

FIG. 15 is a block diagram contrasting the use of a software instruction converter to convert binary instructions in a source instruction set to binary instructions in a target instruction set according to embodiments of the disclosure.

DETAILED DESCRIPTION

Figure 1:
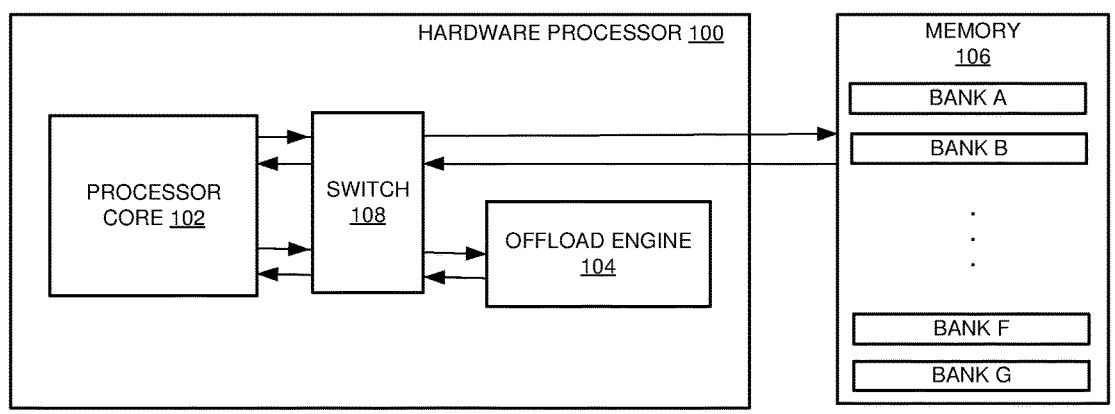
FIG. 1 illustrates a hardware processor according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decode unit (decoder) decoding macro-instructions. A processor (e.g., having one or more cores to decode and/or execute instructions) may operate on data, for example, in performing arithmetic, logic, or other functions.

Certain functions may include operations on vectors (e.g., an array or other ordered list of data elements (entries) with a corresponding index to identify each element), for example, vectors operating on other vectors. An element of a vector may generally refer to a discrete section of data that represents a single value, e.g., identified by its own index value. Elements of a vector may be numbers (e.g., integer, floating-point, etc.). In one embodiment, a vector includes multiple elements to represent a single number, e.g., a single floating point number.

A processor may access (e.g., load and/or store) data in a (e.g., separate from the processor die) memory (e.g., a data storage device). Memory may be system memory, e.g., random access memory (RAM). A data storage device may not include a processor cache and/or not include external storage, such as, but not limited to, a hard disk drive (HDD) storage.

A processor may offload a certain operation(s) (or portions of an operation(s)) to an offload engine. A hardware offload engine may be separate from a processor (e.g., off die) or part of a processor, e.g., part of a core or separate from the core. A processor (e.g., processor core) that is to utilize an offload engine may include an instruction (e.g., having a particular opcode) in its instruction set that causes data to be sent to the hardware offload engine, e.g., when the instruction is executed. In one embodiment, an offload engine includes a finite state machine (FSM) to control its operations, e.g., as discussed herein. In one embodiment, a processor core (for example, a plurality of (e.g., vector) execution units) may execute at a first clock speed and an offload engine may (e.g., simultaneously) execute at a second, faster (or slower) clock speed. In one embodiment, an offload engine operates at more than double the processor clock speed. In one embodiment, an offload engine operates at 2, 3, 4, 5, 6, 7, 8, 9, 10, 11, 12, 13, 14, 15, 16, 17, 18, 19, 20, or 25, etc. times faster (or slower) than the processor clock speed. An offload engine may be a different type of processor than the processor utilizing the offload engine. In one embodiment, the processor and the offload engine use the same instruction set, e.g., ISA.

In one embodiment, a processor includes an application-specific offload engine to address domain-specific problems. Compared to the hardware-only and to the software-only approach, certain embodiments of a hybrid processor architecture may furnish both the flexibility of software (e.g., firmware to run on the processor) and the efficiency of optimized hardware (e.g., an application-specific offload engine). For example, in one embodiment of public key encryption (PKE), a circuit (e.g., a content processing module (CPM)) may include a (e.g., programmable) vector processor (e.g., a modular math processor (MMP)) and an (e.g., big) integer multiplier (521bx521b) offload engine. This embodiment may include an asynchronous use model of the offload engine, e.g., such that sourcing operands and draining the result include the execution of two (e.g., firmware) vector instructions. Such a sequential execution model of instructions may reduce the utilization of the offload engine, and accordingly, the overall throughput of the system. Such a vector processor and an offload engine with a (e.g., highly) parallel data path may also include the utilization of data hazard resolution logic.

In one embodiment of this disclosure, a vector processor (e.g., vector processor architecture) for a very long instruction word (VLIW) type of instruction allows (e.g., highly) parallel data movements within the processor itself and to and/or from the offload engine, for example, data sent by the processor (e.g., core) to the offload engine and/or data sent by the offload engine to the processor. A VLIW instruction (e.g., when executed) may cause multiple (e.g., distinct or different) operations. For example, one VLIW instruction may (e.g., when executed) cause one (e.g., different) operation to be executed on each of a plurality of execution units of the processor.

Certain embodiments of this disclosure include a switch (or switches) and a plurality of execution units to enable parallel data operations. A switch may be a matrix (e.g., crossbar) switch. A matrix switch may generally refer to an assembly of individual switches between a plurality of inputs and a plurality of outputs. A switch may be a non-blocking switch such that other concurrent connections do not prevent connecting other inputs to other outputs. A single input may be connected to multiple outputs.

In one embodiment, if data (e.g., from a first instruction in a pipeline) is needed to perform an operation on that data (e.g., by a second instruction in the pipeline), then the unavailability of the data (e.g., from the first instruction) may cause a delay in the execution of the operation (e.g., by the second instruction). In such a case, a portion of the execution pipeline may use special processing, such as being stalled (e.g., halted), until the data is available (e.g., first instruction completes execution so the resulting data can be used by the second instruction). This condition may be generally referred to as a data hazard.

Certain embodiments of this disclosure include data hazard resolution logic. In one embodiment, a hardware processor includes one or more (e.g., integer) offload engines, one or more execution units (e.g., of a vector processor(s)), multiple memory banks, and a switch (e.g., including data switching logic and/or data hazard resolution logic) that facilitates data movement among any or all of the processing elements and memories, with the ability to detect and/or prevent data hazards. For example, data hazard resolution logic may control vector-processing data path that supports shift (e.g., right or left) operations, e.g., a vector shift operation.

FIG. 1 illustrates a hardware processor 100 according to embodiments of the disclosure. Depicted hardware processor 100 includes a processor core 102, offload engine 104, access to a memory 106, and a switch 108. Any combination of these components may be utilized. Although shown as a separate component, memory 106 may be part of hardware processor 100. A processor core may include one or more execution units (e.g., in series and/or in parallel). An offload engine may perform operations, for example, for a processor core such that the processor core may (e.g., concurrently) perform other operations. Offload engine may provide a signal (e.g., to the processor core) to indicate that its operations are complete (e.g., data is available). Offload engine may be separate from a processor (e.g., off die). Offload engine may have separate (e.g., from a processor's) access to memory, e.g., have direct memory access.

Memory 106 may be any data storage device. Depicted memory 106 includes multiple memory banks, e.g., memory banks A, B, F, and G. Memory may include memory banks A-G. A memory may include any plurality of memory banks. For example, memory may include 2 or more memory banks, 3 or more memory banks, 4 or more memory banks, 5 or more memory banks, etc. Each memory bank may have its own access port or ports (e.g., input and/or output). Each memory bank may be accessed independently from the other memory banks, e.g., multiple memory banks or each memory bank may be accessed simultaneously. Processor may also include a memory. Processor and/or memory may include a buffer, e.g., a shift register.

A switch may receive a control signal (e.g., from processor core 102) to connect certain input(s) to certain output(s). Switch 108 may include any communication paths and is not limited to those depicted in the figures. Switch may selectively connect component(s). For example, switch 108 may connect the processor core, the offload engine, the memory, and any combinations thereof. Note that a single headed arrow herein may not require one-way communication, for example, it may indicate two-way communication (e.g., to and from that component). Any or all combinations of communications paths may be utilized in embodiments herein. Switch may include data hazard resolution logic to control which components are connected together (e.g., a connection being active between two components). Switch may be controlled by a processor (e.g., processor core), for example, by a control signal or signals sent to the switch. In one embodiment, the switch may be within a component of the processor, e.g., within a processor core and/or offload engine. Switch may control (e.g., activate) the connections such that a data path does not allow (e.g., include) a data hazard. Any data path may route back into the switch, e.g., such that an output is routed back as an input.

Figure 2A:
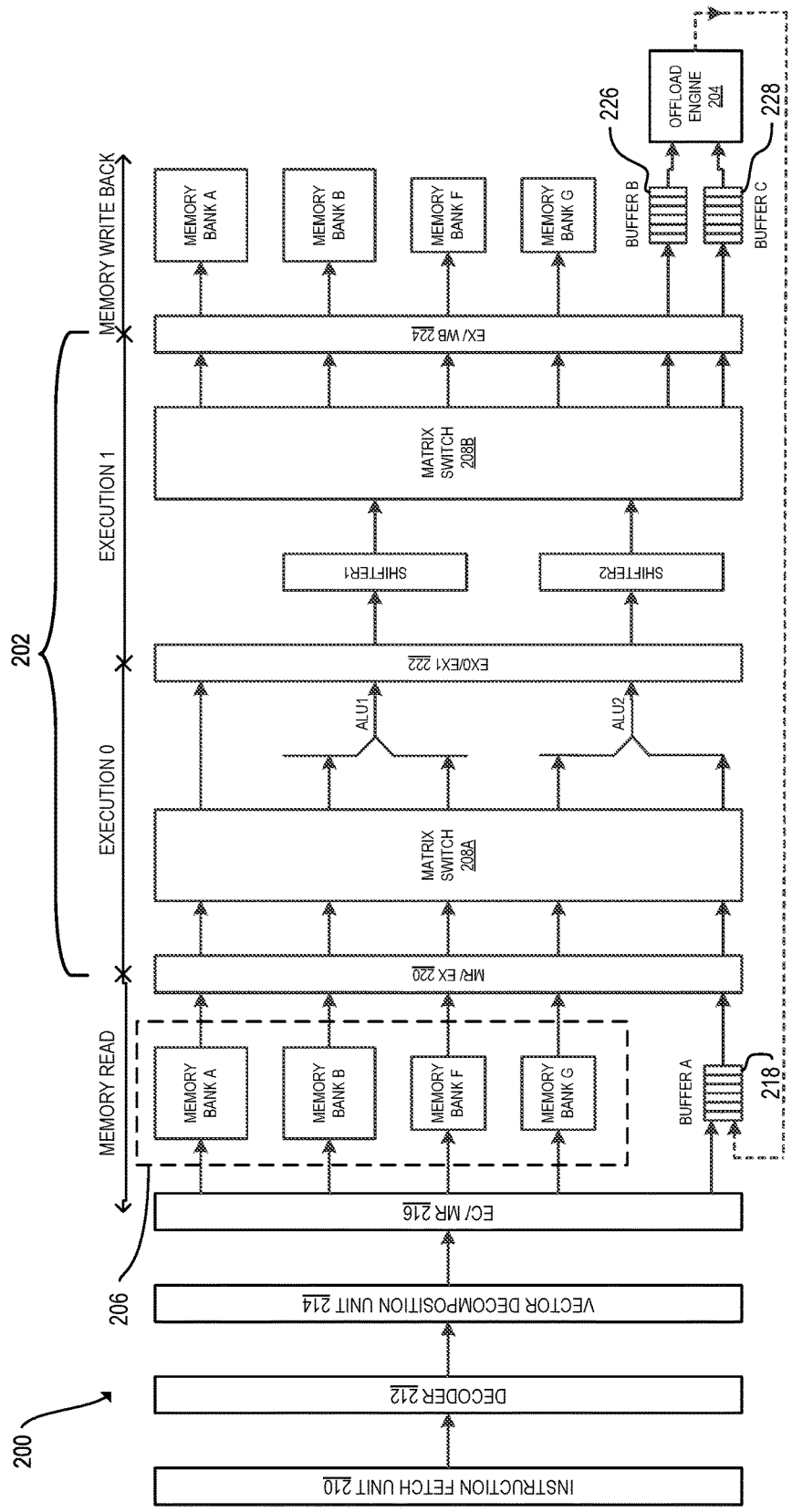
FIG. 2A illustrates data paths through a hardware processor according to embodiments of the disclosure.

FIG. 2A illustrates data paths through a hardware processor 200 according to embodiments of the disclosure. The data flow in FIG. 2A is generally in a left-to-right manner. The depicted data path includes an instruction fetch unit 210 of a processor to fetch an instruction. The fetched instruction (e.g., macro-instruction) then may go to the decoder 212, e.g., to be decoded to generate as an output one or more micro-operations, micro-code entry points, micro-instructions, other instructions, or other control signals, which are decoded from, or which otherwise reflect, or are derived from, the original instruction. The decoded instruction may then go to a vector decomposition unit 214, for example, to convert a (e.g., VLIW) vector instruction into multiple (e.g., double-quad-word) sub-instructions that may be executed by the depicted data path of the processor 200 (e.g., in a manner that is transparent to the exposed instruction set architecture). Any or all of instruction fetch unit 210, decoder 212, and vector decomposition unit 214 may be optional. Further, although multiple pipeline registers (e.g., EC/MR register 216, MR/EX register 220, EX0/EX1 register 222, and EX/WB register 224) are depicted, any single or plurality of pipeline registers may be utilized. In one embodiment, no pipeline registers are utilized.

The rest of the depicted data path includes successive processor pipeline stages that are labeled: memory read (MR), execution0 (EX0), execution1 (EX1), and memory write-back (WB). In one embodiment, execution stages are part of (e.g., a single core 202 of) a processor 200, for example, a processor (e.g., including a core) having the circuitry depicted. Processor core 202 may include circuitry with multiple execution stages (e.g., in series) or circuitry that re-routes data output from a single execution stage in as an input to that single execution stage, e.g., output(s) connected back in as input(s). In one embodiment, switch 208A and switch 208B may be the same switch. Any or all of instruction fetch unit 210, decoder 212, and vector decomposition unit 214 may be part of hardware processor 200 or processor core 202. Although a single processor core is shown in certain figures, a hardware processor may include a plurality of processor cores. In one embodiment, error correction (e.g., error correction unit) may occur in the pipeline, e.g., before memory read (MR).

In one embodiment, the memory (e.g., RAM) banks in the MR stage are the same physical instances in the write back (WB) stage. In the depicted embodiment, the (e.g., first-in first-out (FIFO)) buffer A (e.g., input buffer) in the MR stage is the same as the buffer receiving the output of the offload engine 204. In one embodiment, the buffer receiving the output of the offload engine 204 is a different buffer. Offload engine 204 is shown providing its output directly to an input of the buffer 218. In one embodiment, an offload engine provides its output through the pipeline, e.g., through an input of pipeline register 216. In one embodiment, a bypass may exist to bypass any or some of the above circuitry, for example, a separate bypass between matrix switch 208A and matrix switch 208B, e.g., used for path (2) in FIG. 2B. In one embodiment, the circuitry between matrix switch 208A and matrix switch 208B may be used as a bypass, for example, through ALU2, EX0/EX1 register 222 (if present), and shifter 2 (if present), e.g., without performing any operations on the data other than forwarding it onward.

In one embodiment, the processor (e.g., through data paths depicted in FIG. 2A) is to write to a second (e.g., FIFO) buffer or set of buffers (e.g., buffer B 226 and buffer C 228) and read from a first buffer (e.g., buffer A 218) simultaneously (e.g., overlapping in time). In one embodiment, a hardware processor may pre-process and post-process the data to and/or from the offload engine 204. One example of this usage in public key calculations is the Karatsuba multiplication wherein intermediate multiplication results may be stitched together. Another example is the formula used in elliptic curve cryptography (ECC) point additions and point doubling.

In certain embodiments, a processor may include a plurality (e.g., two) of (e.g., vector) execution units (e.g., in parallel and/or in series). In one embodiment, an (e.g., vector) arithmetic logic unit (ALU) execution unit is in series with (e.g., providing output to) a shifter execution unit. In certain embodiments this may circumvent the data (e.g., structural) hazard that may arise in the parallel operations. A data (e.g., structural) hazard may also occur for memory (e.g., RAM) banks, e.g., memory banks 206. A plurality of memory banks (e.g., memory bank A and memory bank B) may be (e.g., simultaneously) utilized, for example, where offload engine 204 (e.g., a big-integer multiplier in one embodiment) takes two inputs (e.g., input operands). This may allow parallel sourcing and draining without a simultaneous read and/or write required on one memory bank. For example, the Karatsuba decomposition of multiplication may utilize two memory writes and three memory reads simultaneously to fully exploit the parallelism available in the algorithm. The depicted data path includes another plurality of memory banks (e.g., memory bank F and memory bank G). In one embodiment, utilizing a plurality of memory banks (e.g., each with its own input port and output port separate from the input ports and the output ports of the other memory banks) may be more (e.g., area) efficient than adding additional ports to a fewer number of memory banks. In certain embodiments (e.g., MMP), a plurality of (e.g., less than all of) the memory banks (e.g., memory bank F and memory bank G) may be used as a temporary storage for back-to-back multiplications and/or as an accumulator for the inner product. In one embodiment, a first set of memory banks (e.g., memory bank F and memory bank G) is smaller in storage capacity relative to a second set of memory banks (e.g., memory bank A and memory bank B).

A source may be routed to multiple input ports. The data paths disclosed herein may support the use examples previously mentioned, but also enable direct parallel data movements among memory (e.g., RAM) banks and buffers for example, input and output (e.g., FIFO) buffers. In one embodiment, a data path of a processor may allow data to be moved back and forth between a temporary storage (e.g., memory banks F and G) and a main storage (e.g., memory banks A and B), for example, in parallel with other operations.

In one embodiment, e.g., to maximally exploit the parallelism related to the simultaneous sourcing and draining of an offload engine, a processor may include a data path(s) that supports either or both of the following source-sink pairs:

any of a plurality of (e.g., 5) output ports of sources (e.g., memory banks A, B, F, and G and buffer A) to (e.g., each) input ports (e.g., 4) of a plurality of ALUs (e.g., ALU1 and ALU2, in parallel in FIGS. 2A-2B), and any of a plurality of (e.g., 7) output ports of sources (e.g., memory banks A, B, F, and G, buffer A, and ALU1 and ALU2) to input ports (e.g., 6) of a plurality of sinks (e.g., memory banks A, B, F, and G, buffer B, and buffer C).

The parallel movements in the indicated source-sink pairs may be connected (e.g., enabled) by switch 208A and switch 208B. In one embodiment, the switch(es) are sent a control signal(s) to select which input or inputs (e.g., port) should connect with which output (e.g., port) or outputs. For example, an instruction may include (e.g., as a field thereof) the control signals, for example, to control which connections are active. An instruction (e.g., when executed by a processor) may indicate what type of operation is to be executed on input data by an ALU. ALU1 and ALU2 may simultaneously execute different types of operations.

One embodiment, e.g., to support parallelism in a data path at the instruction set architecture level, may include a 64-bit VLIW-style instruction, named "dexec" in this example and with the following format in Table 1.

TABLE 1

| Instruction Fields | Description |
| --- | --- |
| dexec ID (4 bits) | dexec instruction identifier |
| Memory Banks Read Control (13 bits) | Configures memory read addresses and lengths |
| ALU Input Source Routing (6 bits) | Configures mapping between the 5 data sources to the 4 input ports of the two ALUs |
| ALU and Shift Mode Control (14 bits) | Configures ALUs and Shifters operations |
| Write Source Routing (27 bits) | Configures mapping between the 7 data sources to the 6 data sinks |

Figure 2B:
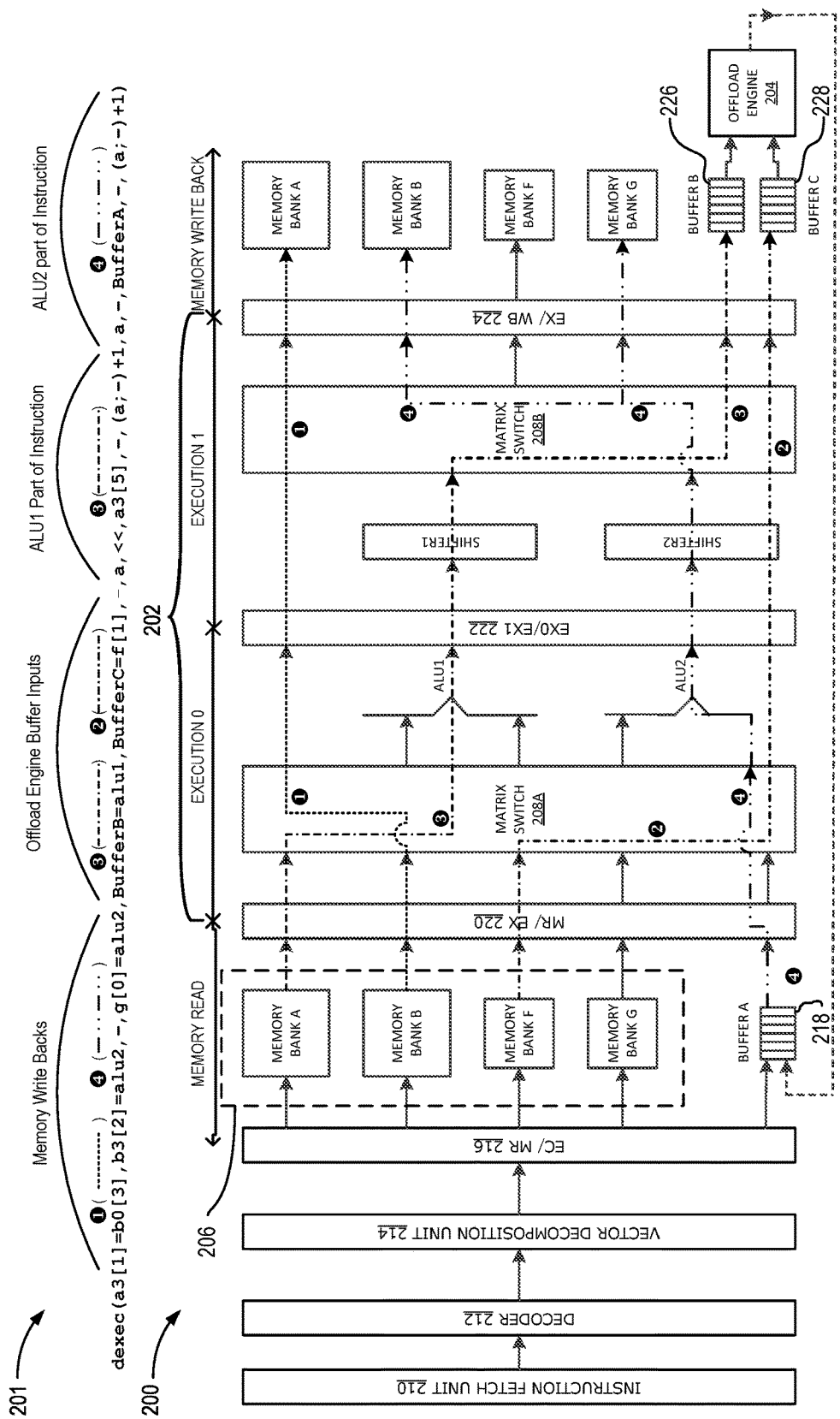
FIG. 2B illustrates active data paths through the hardware processor in FIG. 2A according to embodiments of the disclosure.

Turning now to FIG. 2B, an example of another instruction will be discussed. FIG. 2B illustrates active data paths through the hardware processor 200 in FIG. 2A according to embodiments of the disclosure. This example "dexec" instruction 201 includes four different fields (memory write back, multiplier buffer inputs, ALU1 part of instruction, and ALU2 part of instruction). The different line dashings indicate the different connections that the instruction causes (e.g., from execution of the instruction by the processor) via switches 208A and 208B. For example, in the first section of the memory write back field, a3[1], b0[3] may refer to the fourth element of the zeroth array in memory bank B being written to the second element of the third array in memory bank A. For example, the vector starting at the fourth element of bank B may be written (e.g., copied) into memory bank A starting at the second element in memory bank A. A "-" may indicate no value in a field, e.g., that operation field is not being utilized in a particular example. In one embodiment, a processor does not include a stall (e.g., in the execution pipeline). A stall may be a no operation (NOP) instruction, bubble, etc. A stall may refer to an intra-vector stall, for example, a stall while a vector operation is occurring, e.g., in execution stage 0 or execution stage 1.

The instruction shown in FIG. 2B may be an example of an instruction to operate on multiple source and destination operands at the same time while resolving potential data hazards within the instruction and/or between successive instructions. At a high level, the depicted instruction includes two arithmetic operations facilitated respectively by ALU1 and ALU2, with one instance of queuing operands for the hardware offload engine (e.g., multiplier) and three instances of data-movement operations targeting the four memory banks A, B, F and G. An example of these operations (e.g., in sequence) may be:

ALU1: The vector operand a3[5], sourced from memory bank A, is subjected to a bit rotation and copied to output, with the output operand having extra data (e.g., a quadword) in its most significant bit (MSB) part. The destination of ALU1's output is expressed in the other parts of this instruction.

ALU2: ALU2 sources a single operand, which is the output of buffer A sourced from the hardware offload engine's (e.g., multiplier) output. The operation may be to copy this operand to the output of ALU2, e.g., after adding additional data (e.g., a quadword) in the MSB part. (This last operation may be designated by the "+1"). This example instruction does not apply the binary operator capabilities of ALU1 and ALU2, but instead in an example of unary operands. An ALU may perform binary and/or unary operations.

Hardware multiplier offload engine (e.g., multiplier): The multiplier may source its operands (e.g., from buffer B and buffer C) from the output of ALU1 (e.g., as explained above) and vector operand, f[1], sourced from memory bank F.

Memory Copy Operations (reading left to right):

(1) a2[1]=b0[3] is to copy (e.g., vector) operand b0[3] to a2[1].

(2) b3[2]=ALU2 is to copy the output of ALU2 (e.g., explained above) to (e.g., vector) operand b3[2] in memory bank B.

(3) g[0]=ALU2 is to also copy the output of ALU2 (e.g., as a second destination operand) to (e.g., vector) operand g[0] in memory bank G. Certain embodiments may allow a fourth data-copy operation to a memory bank, but this option is not used in this example instruction.

As another example, a hardware processor may include activating data paths to square a number stored in memory bank A that is larger than the width (w) of the offload engine (e.g., a multiplier). For example, the number stored in memory bank A may be a vector that is twice the size of a multiplier offload engine. In this example, as step 1, an instruction may be received to send the half vector from bank A's address a to the multiplier buffers B and C (e.g., multiplication one). As step 2, an instruction may send the half vector from bank A's address a+width (w) to the multiplier buffers B and C (e.g., multiplication two). As step 3, an instruction may send both half vector from bank A to the multiplier offload engine, shifting one on the way (e.g., multiplication 3). As step 4, the hardware processor may store the output of the multiplier offload engine (e.g., result of multiplication 1) into memory bank B at address [b,b+2w]. As step 5, the hardware processor may store the output of the multiplier offload engine (e.g., result of multiplication 2) in bank B at address [b+2w, b+4w]. As step 6, the hardware processor may read bank B between address [b+w,b+3w], send the data thru an ALU to add it to the output of the multiplier offload engine (e.g., result of multiplication 3), and store that in bank B at address [b+w,b+3w].

Between step 5 and 6, there is a read after write and the logic may prevent a data hazard there. Within step 6, there may be a (e.g., perfect) overlap of read and write within the same instruction. In one embodiment, step 4 and step 1 are merged into a single instruction and run at the same time. In one embodiment, step 5 and step 2 are merged into a single instruction and run at the same time. In one embodiment, step 6 and step 3 are merged into a single instruction and run at the same time. Certain embodiments herein provide data hazard resolution logic for a pipelined processor. As an example for MMP, a read after write (RAW) hazard may be applicable, which may occur between two successive vector instructions when the leading instruction is writing to, and the lagging instruction is reading from, an overlapped address (e.g., range of addresses) of the same data storage (e.g., memory bank). In certain embodiments, a stall (e.g., NOP) is not to be inserted intra-vector (e.g., in the middle of the vector) instruction execution, for example, due to the shift-right operation of the data path that involves forwarding of the least significant bit(s) (LSB) from EX0 to EX1 stage. In one embodiment, a vector operation may be from the least-significant element (e.g., quad-word) to the most-significant element (e.g., quad-word), e.g., so that to perform the shift-right operation, the shifter takes the LSB from the next element (e.g., quad-word) in the vector. In the data path in FIGS. 2A-2B, this corresponds to taking the forwarded LSB from the EX0 stage and bypassing the EX0/EX1 pipeline. If a stall is inserted into certain embodiments, e.g., inserted in the MR/EX pipeline in the middle of the vector operation that performs the right shift, then the EX1 stage may not make forward progress due to the lack of the valid LSB forwarding from EX0 stage, e.g., causing a deadlock where the hazard condition will persist.

Because of the above-mentioned restriction in inserting a stall, the detection of the RAW data hazard condition (e.g., in MMP) may be done in the decoder before the instruction is issued to the vector decomposition unit, for example, by checking the address range of the instruction against the address range of the pending writes in the data path. In certain embodiments, there may be pending writes in the data path from multiple vector instructions to multiple, different memory banks. Certain embodiments of this disclosure prevent a hazard in the data path without utilizing an intra-vector stall (e.g., NOP interruption). In one embodiment, a vector instruction is issued by a decoder without checking for a (e.g., RAW) data hazard. A data hazard may be checked for before reading from the memory banks, e.g., at the EC/MR pipeline stage. The checking may be done (e.g., by an error checking unit) on each element (e.g., word) of the vector as it reaches a certain stage, e.g., the EC/MR stage. The checking may be checking that none of the pending writes in the rest of the data path are the immediate address(es) to be read. If a (e.g., RAW) data hazard is detected, the processor may insert an inter-vector stall (e.g., NOP) there without inserting an intra-vector stall (e.g., NOP). In more aggressive instruction scheduling, a trailing instruction which is scheduled early may detect that the pipeline of the previous instruction is not completed and may cause a hazard. If the pipeline is at most n cycles, then n address comparators may be utilized to detect the hazard, for example, in contrast to performing checks of nearly overlapping address ranges which may require implementations with side effects when the range includes memory boundaries and memory wrap-around.

Figure 3:
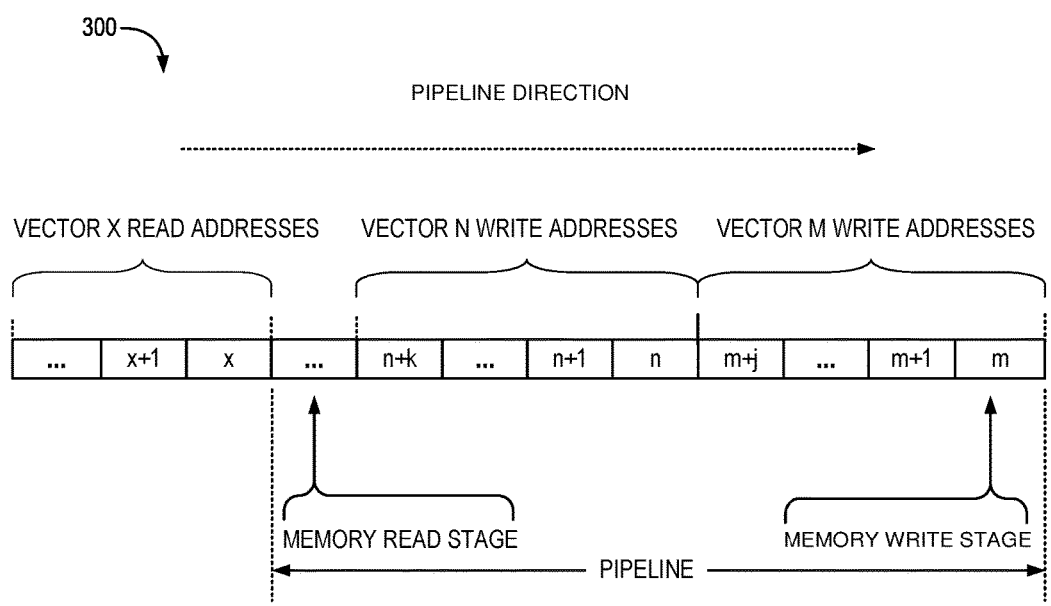
FIG. 3 illustrates multiple vectors transitioning through a data path according to embodiments of the disclosure.

FIG. 3 illustrates multiple vectors transitioning through a data path 300 according to embodiments of the disclosure, e.g., as a pipeline snapshot. Data hazard resolution (e.g., logic) may include any or all of the following. In one embodiment (a), data hazard resolution includes having the addresses in the pipeline only be incremented by one, e.g., as the vectors move to the right. As such, if, at the time of issuing (e.g., element) x into the pipeline, $x=m-d<m$, where d is a positive integer, then the stride d may consistently be maintained as the two vectors make forward progress. Specifically, the read addresses from vector x may continually lag write addresses from vector m by the distance of d. In one embodiment (b), if, at the time of issuing x, that $x=m+j+d>m+j$, where d is a positive integer, then the stride of d may consistently be maintained as the two vectors make forward progress. Specifically, the read addresses from vector x may (e.g., always) be outside of the write address range from vector m active in the pipeline. In one embodiment, due to the address check, vector x may move if (e.g., and only if) one of the above two conditions (a) and (b) hits with $d \geq 1$. If neither of the two applies, a (e.g., inter-vector) stall (e.g., NOP) may be inserted, e.g., until eventually either (a) becomes applicable with d=1 or vector M disappears. In one embodiment (d), if there is another vector, e.g., vector n, trailing vector m then the forward progress of vector x may be further subject to: $x<n$ or $x>n+k$. If neither is applicable, a (e.g., inter-vector) stall (e.g., NOP) may be inserted to allow vector m and n to progress, e.g., until vector n is located at the tail of the pipeline. Then, (a), (b), and (c) may be recursively applicable for vector n. In one embodiment (e), if there are more vectors trailing vector n in the pipeline, (d) may be recursively applicable. In one embodiment, an address check may include checking if any of the (j+k+2) number of comparators indicate an address of m being equal to the address of x being read.

Certain embodiments of this disclosure may not check any ranges, e.g., it may only check for equality of the pending write addresses in the pipeline against the single read address at hand. Certain embodiments of this disclosure may allow data hazard resolution logic to not check if pending writes belong to one vector instruction or not, e.g., without using dynamic vector tracking logic.

Certain embodiments herein may achieve 100% or about 100% utilization of an offload engine. Certain embodiments herein providing a tight coupling for heterogeneous parallel processing by two different processing engines (e.g., a processor core, or, as a further example, an execution unit thereof) through an (e.g., VLIW) instruction set, for example, in contrast to a parallel processing architecture that provides for either tightly coupled uniform processing (e.g., as in an single instruction, multiple data (SIMD) implementation) or very loosely coupled execution where only one processing group (e.g., ensemble) is busy with homogenous processing while the other waits (e.g., as in general purpose computing on graphics processing unit (GPGPU) computing). In contrast, in certain embodiments herein, both processing elements (e.g., wherein one is an offload engine (or other processor) running at a different speed than a processor in that system) are collaborating at an instruction level to perform a given task, e.g., with the instruction set having a VLIW structure as opposed to a SIMD structures.

Figure 4:
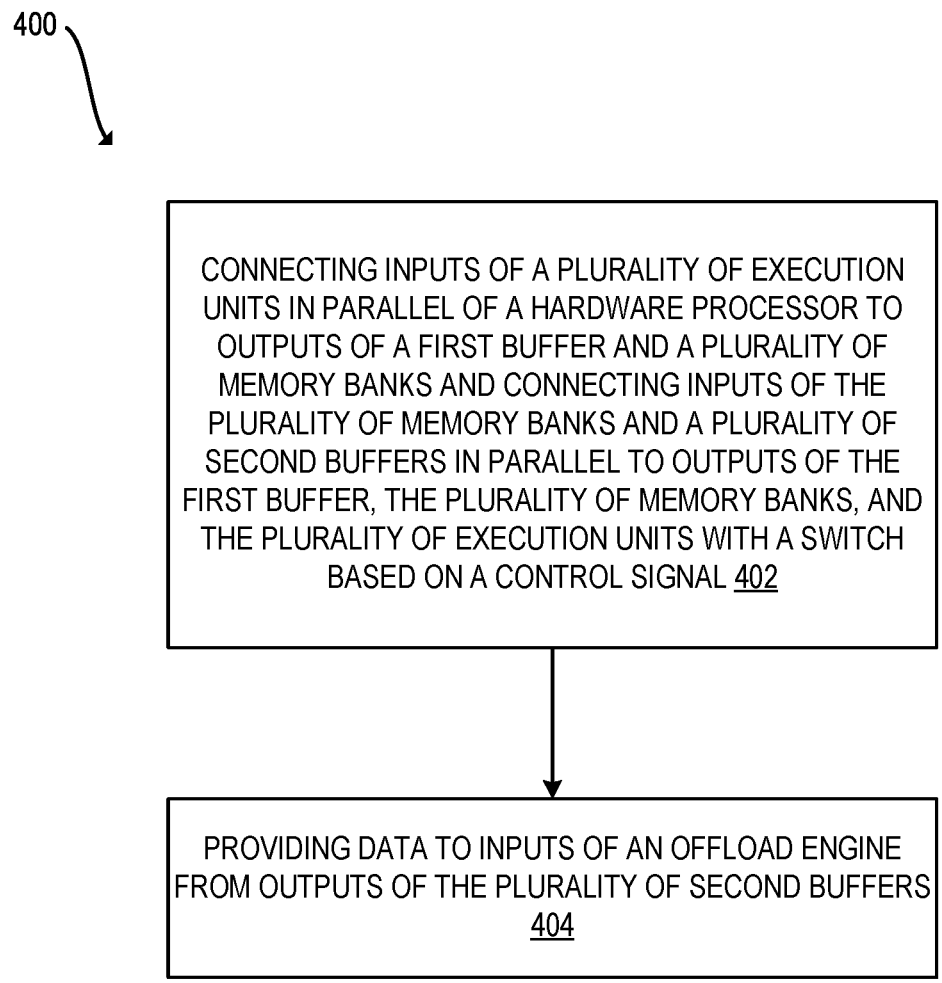
FIG. 4 illustrates a flow diagram according to embodiments of the disclosure.

FIG. 4 illustrates a flow diagram 400 according to embodiments of the disclosure. Flow diagram 400 includes connecting inputs of a plurality of execution units in parallel of a hardware processor to outputs of a first buffer and a plurality of memory banks and connecting inputs of the plurality of memory banks and a plurality of second buffers in parallel to outputs of the first buffer, the plurality of memory banks, and the plurality of execution units with a switch based on a control signal 402, and providing data to inputs of an offload engine from outputs of the plurality of second buffers 404. Processor may include logic, e.g., a finite state machine, that operates according to the flow diagram herein.

In one embodiment, a hardware processor includes a plurality of (e.g., vector) execution units in parallel, a switch to connect inputs of the plurality of execution units to outputs of a first buffer and a plurality of memory banks and connect inputs of the plurality of memory banks and a plurality of second buffers in parallel to outputs of the first buffer, the plurality of memory banks, and the plurality of execution units, and an offload engine with inputs connected to outputs of the plurality of second buffers. An output of the offload engine may connect to an input of the first buffer. The hardware processor may further include data hazard resolution logic to simultaneously read from the output of the first buffer and write to the inputs of the plurality of second buffers. The data hazard resolution logic may not insert a (e.g., intra-vector) stall. The plurality of (e.g., vector) execution units may execute at a first clock speed and the offload engine may execute at a second, faster (or slower) clock speed. An execution unit may include a shift register. The plurality of execution units may each include a shift register. The first buffer and the plurality of second buffers may be first in first out (FIFO) buffers. The plurality of memory banks may be four or more memory banks and each memory bank may include an input port and an output port separate from input ports and output ports of the other memory banks.

In another embodiment, a method includes connecting inputs of a plurality of execution units in parallel of a hardware processor to outputs of a first buffer and a plurality of memory banks and connecting inputs of the plurality of memory banks and a plurality of second buffers in parallel to outputs of the first buffer, the plurality of memory banks, and the plurality of execution units with a switch based on a control signal, and providing data to inputs of an offload engine from outputs of the plurality of second buffers. The method may include providing data from an output of the offload engine to an input of the first buffer. The method may include simultaneously reading from the output of the first buffer and writing to the inputs of the plurality of second buffers. The method may include not inserting a stall, e.g., to be executed by an execution unit. The method may further include the plurality of execution units executing at a first clock speed and the offload engine executing at a second, faster (or slower) clock speed. The plurality of execution units may each include a shift register. The plurality of memory banks are four or more memory banks and each memory bank includes an input port and an output port separate from input ports and output ports of the other memory banks. The first buffer and the plurality of second buffers may be first in first out (FIFO) buffers.

In yet another embodiment, a hardware processor includes a hardware decoder to decode an instruction, a hardware execution unit to execute the instruction to: connect inputs of a plurality of execution units in parallel of the hardware processor to outputs of a first buffer and a plurality of memory banks and connecting inputs of the plurality of memory banks and a plurality of second buffers in parallel to outputs of the first buffer, the plurality of memory banks, and the plurality of execution units based on a control signal, and provide data to inputs of an offload engine from outputs of the plurality of second buffers. An output of the offload engine may connect to an input of the first buffer. The hardware execution unit may execute the instruction to cause a simultaneous read from the output of the first buffer and write to the inputs of the plurality of second buffers. The hardware execution unit may execute the instruction without inserting a stall. The plurality of execution units may execute at a first clock speed and the offload engine may execute at a second, faster (or slower) clock speed. The plurality of execution units may each include a shift register. The first buffer and the plurality of second buffers may be first in first out (FIFO) buffers. The plurality of memory banks may be four or more memory banks and each memory bank may include an input port and an output port separate from input ports and output ports of the other memory banks.

In another embodiment, a hardware apparatus includes a plurality of execution units in parallel, means to connect inputs of the plurality of execution units to outputs of a first buffer and a plurality of memory banks and connect inputs of the plurality of memory banks and a plurality of second buffers in parallel to outputs of the first buffer, the plurality of memory banks, and the plurality of execution units, and an offload engine with inputs connected to outputs of the plurality of second buffers.

In yet another embodiment, an apparatus comprises a data storage device that stores code that when executed by a hardware processor causes the hardware processor to perform any method disclosed herein.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, April 2015; and see Intel® Architecture Instruction Set Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 5A:
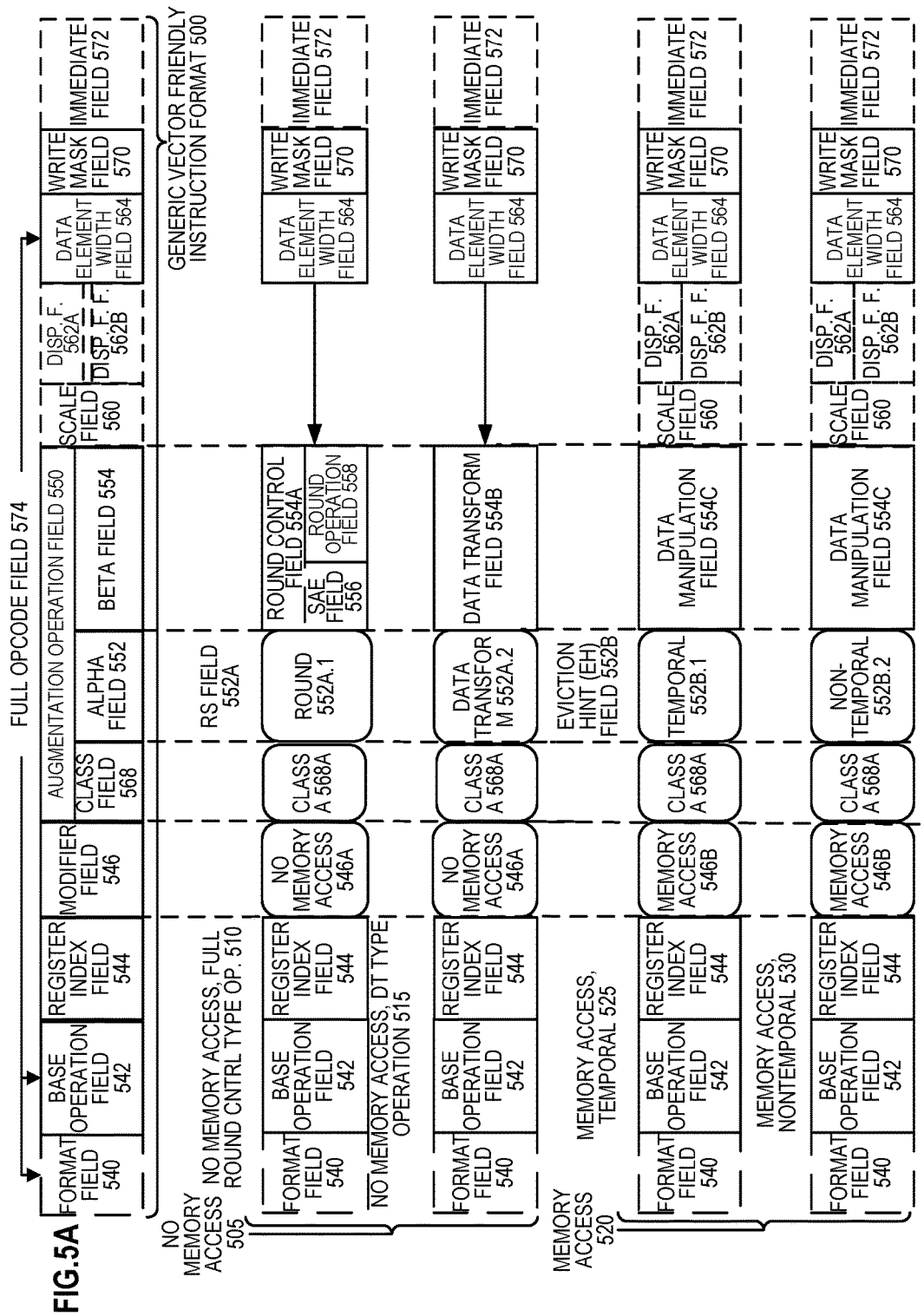
FIG. 5A is a block diagram illustrating a generic vector friendly instruction format and class A instruction templates thereof according to embodiments of the disclosure.
Figure 5B:
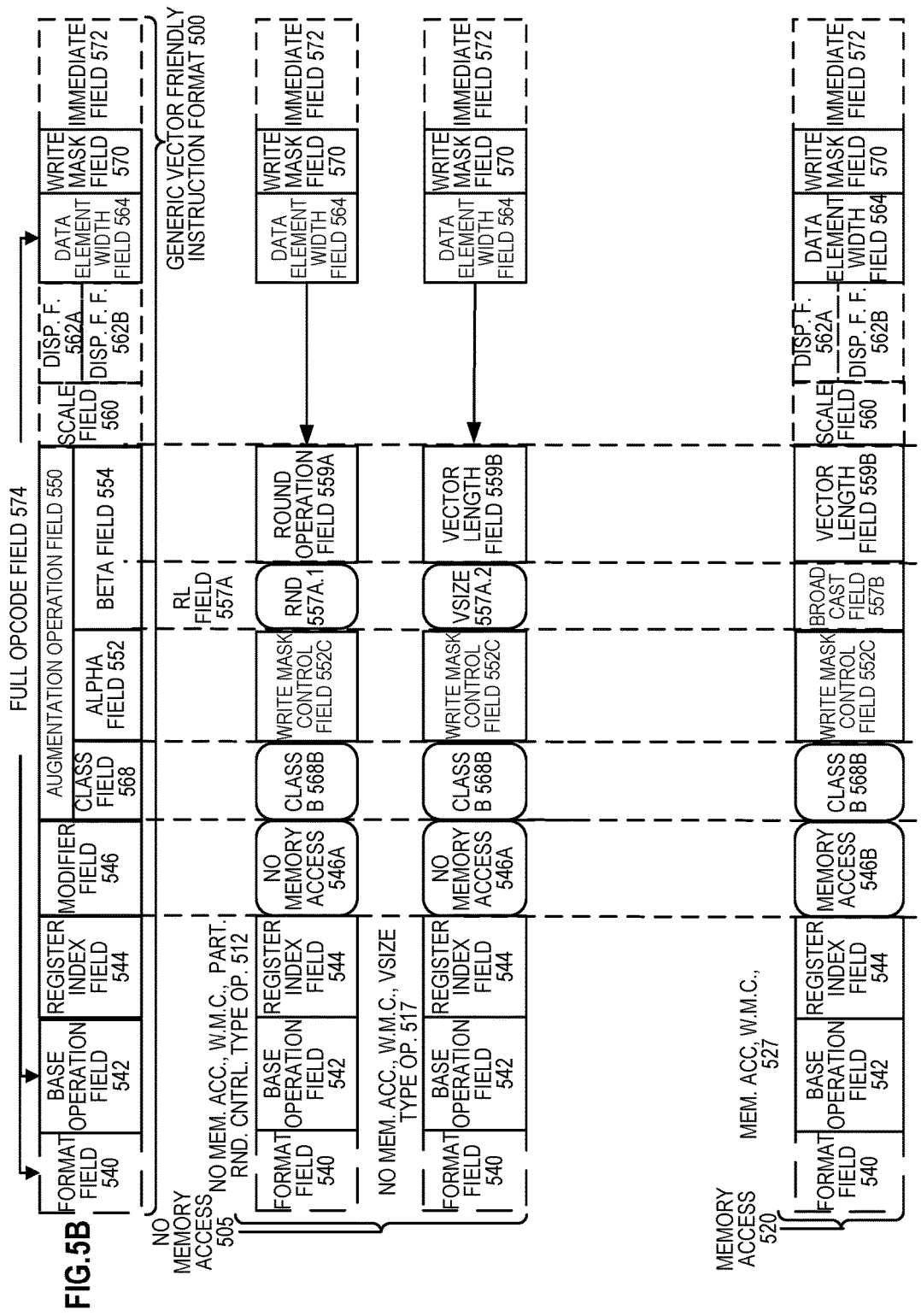
FIG. 5B is a block diagram illustrating the generic vector friendly instruction format and class B instruction templates thereof according to embodiments of the disclosure.

FIGS. 5A-5B are block diagrams illustrating a generic vector friendly instruction format and instruction templates thereof according to embodiments of the disclosure. FIG. 5A is a block diagram illustrating a generic vector friendly instruction format and class A instruction templates thereof according to embodiments of the disclosure; while FIG. 5B is a block diagram illustrating the generic vector friendly instruction format and class B instruction templates thereof according to embodiments of the disclosure. Specifically, a generic vector friendly instruction format 500 for which are defined class A and class B instruction templates, both of which include no memory access 505 instruction templates and memory access 520 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

A hardware processor, e.g., an MMP hardware processor with a multiplier offload engine, may perform multi-precision calculations. A hardware processor may shift a vector of 128, 256, 512, 1024, etc. bits, for example, performing in a single (e.g., VLIW) instruction the division of an (e.g., very large) integer by 2 or the multiplication of an (e.g., very large) integer by 2.

The class A instruction templates in FIG. 5A include: 1) within the no memory access 505 instruction templates there is shown a no memory access, full round control type operation 510 instruction template and a no memory access, data transform type operation 515 instruction template; and 2) within the memory access 520 instruction templates there is shown a memory access, temporal 525 instruction template and a memory access, non-temporal 530 instruction template. The class B instruction templates in FIG. 5B include: 1) within the no memory access 505 instruction templates there is shown a no memory access, write mask control, partial round control type operation 512 instruction template and a no memory access, write mask control, vsize type operation 517 instruction template; and 2) within the memory access 520 instruction templates there is shown a memory access, write mask control 527 instruction template.

The generic vector friendly instruction format 500 includes the following fields listed below in the order illustrated in FIGS. 5A-5B.

Format field 540—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 542—its content distinguishes different base operations.

Register index field 544—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 546—its content distinguishes occurrences of instructions in the generic vector instruction format that specify memory access from those that do not; that is, between no memory access 505 instruction templates and memory access 520 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 550—its content distinguishes which one of a variety of different operations to be performed in addition to the base operation. This field is context specific. In one embodiment of the disclosure, this field is divided into a class field 568, an alpha field 552, and a beta field 554. The augmentation operation field 550 allows common groups of operations to be performed in a single instruction rather than 2, 3, or 4 instructions.

Scale field 560—its content allows for the scaling of the index field's content for memory address generation (e.g., for address generation that uses 2scale*index+base).

Displacement Field 562A—its content is used as part of memory address generation (e.g., for address generation that uses 2scale*index+base+displacement).

Displacement Factor Field 562B (note that the juxtaposition of displacement field 562A directly over displacement factor field 562B indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 574 (described later herein) and the data manipulation field 554C. The displacement field 562A and the displacement factor field 562B are optional in the sense that they are not used for the no memory access 505 instruction templates and/or different embodiments may implement only one or none of the two.

Data element width field 564—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 570—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 570 allows for partial vector operations, including loads, stores, arithmetic, logical, etc. While embodiments of the disclosure are described in which the write mask field's 570 content selects one of a number of write mask registers that contains the write mask to be used (and thus the write mask field's 570 content indirectly identifies that masking to be performed), alternative embodiments instead or additional allow the mask write field's 570 content to directly specify the masking to be performed.

Immediate field 572—its content allows for the specification of an immediate. This field is optional in the sense that is it not present in an implementation of the generic vector friendly format that does not support immediate and it is not present in instructions that do not use an immediate.

Class field 568—its content distinguishes between different classes of instructions. With reference to FIGS. 5A-B, the contents of this field select between class A and class B instructions. In FIGS. 5A-B, rounded corner squares are used to indicate a specific value is present in a field (e.g., class A 568A and class B 568B for the class field 568 respectively in FIGS. 5A-B).

Instruction Templates of Class A

In the case of the non-memory access 505 instruction templates of class A, the alpha field 552 is interpreted as an RS field 552A, whose content distinguishes which one of the different augmentation operation types are to be performed (e.g., round 552A.1 and data transform 552A.2 are respectively specified for the no memory access, round type operation 510 and the no memory access, data transform type operation 515 instruction templates), while the beta field 554 distinguishes which of the operations of the specified type is to be performed. In the no memory access 505 instruction templates, the scale field 560, the displacement field 562A, and the displacement scale filed 562B are not present.

No-Memory Access Instruction Templates—Full Round Control Type Operation

In the no memory access full round control type operation 510 instruction template, the beta field 554 is interpreted as a round control field 554A, whose content(s) provide static rounding. While in the described embodiments of the disclosure the round control field 554A includes a suppress all floating point exceptions (SAE) field 556 and a round operation control field 558, alternative embodiments may support may encode both these concepts into the same field or only have one or the other of these concepts/fields (e.g., may have only the round operation control field 558).

SAE field 556—its content distinguishes whether or not to disable the exception event reporting; when the SAE field's 556 content indicates suppression is enabled, a given instruction does not report any kind of floating-point exception flag and does not raise any floating point exception handler.

Round operation control field 558—its content distinguishes which one of a group of rounding operations to perform (e.g., Round-up, Round-down, Round-towards-zero and Round-to-nearest). Thus, the round operation control field 558 allows for the changing of the rounding mode on a per instruction basis. In one embodiment of the disclosure where a processor includes a control register for specifying rounding modes, the round operation control field's 550 content overrides that register value.

No Memory Access Instruction Templates—Data Transform Type Operation

In the no memory access data transform type operation 515 instruction template, the beta field 554 is interpreted as a data transform field 554B, whose content distinguishes which one of a number of data transforms is to be performed (e.g., no data transform, swizzle, broadcast).

In the case of a memory access 520 instruction template of class A, the alpha field 552 is interpreted as an eviction hint field 552B, whose content distinguishes which one of the eviction hints is to be used (in FIG. 5A, temporal 552B.1 and non-temporal 552B.2 are respectively specified for the memory access, temporal 525 instruction template and the memory access, non-temporal 530 instruction template), while the beta field 554 is interpreted as a data manipulation field 554C, whose content distinguishes which one of a number of data manipulation operations (also known as primitives) is to be performed (e.g., no manipulation; broadcast; up conversion of a source; and down conversion of a destination). The memory access 520 instruction templates include the scale field 560, and optionally the displacement field 562A or the displacement scale field 562B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 552 is interpreted as a write mask control (Z) field 552C, whose content distinguishes whether the write masking controlled by the write mask field 570 should be a merging or a zeroing.

In the case of the non-memory access 505 instruction templates of class B, part of the beta field 554 is interpreted as an RL field 557A, whose content distinguishes which one of the different augmentation operation types are to be performed (e.g., round 557A.1 and vector length (VSIZE) 557A.2 are respectively specified for the no memory access, write mask control, partial round control type operation 512 instruction template and the no memory access, write mask control, VSIZE type operation 517 instruction template), while the rest of the beta field 554 distinguishes which of the operations of the specified type is to be performed. In the no memory access 505 instruction templates, the scale field 560, the displacement field 562A, and the displacement scale filed 562B are not present.

In the no memory access, write mask control, partial round control type operation 510 instruction template, the rest of the beta field 554 is interpreted as a round operation field 559A and exception event reporting is disabled (a given instruction does not report any kind of floating-point exception flag and does not raise any floating point exception handler).

Round operation control field 559A—just as round operation control field 558, its content distinguishes which one of a group of rounding operations to perform (e.g., Round-up, Round-down, Round-towards-zero and Round-to-nearest). Thus, the round operation control field 559A allows for the changing of the rounding mode on a per instruction basis. In one embodiment of the disclosure where a processor includes a control register for specifying rounding modes, the round operation control field's 550 content overrides that register value.

In the no memory access, write mask control, VSIZE type operation 517 instruction template, the rest of the beta field 554 is interpreted as a vector length field 559B, whose content distinguishes which one of a number of data vector lengths is to be performed on (e.g., 128, 256, or 512 byte).

In the case of a memory access 520 instruction template of class B, part of the beta field 554 is interpreted as a broadcast field 557B, whose content distinguishes whether or not the broadcast type data manipulation operation is to be performed, while the rest of the beta field 554 is interpreted the vector length field 559B. The memory access 520 instruction templates include the scale field 560, and optionally the displacement field 562A or the displacement scale field 562B.

With regard to the generic vector friendly instruction format 500, a full opcode field 574 is shown including the format field 540, the base operation field 542, and the data element width field 564. While one embodiment is shown where the full opcode field 574 includes all of these fields, the full opcode field 574 includes less than all of these fields in embodiments that do not support all of them. The full opcode field 574 provides the operation code (opcode).

The augmentation operation field 550, the data element width field 564, and the write mask field 570 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 6 is a block diagram illustrating an exemplary specific vector friendly instruction format according to embodiments of the disclosure. FIG. 6 shows a specific vector friendly instruction format 600 that is specific in the sense that it specifies the location, size, interpretation, and order of the fields, as well as values for some of those fields. The specific vector friendly instruction format 600 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 5 into which the fields from FIG. 6 map are illustrated.

It should be understood that, although embodiments of the disclosure are described with reference to the specific vector friendly instruction format 600 in the context of the generic vector friendly instruction format 500 for illustrative purposes, the disclosure is not limited to the specific vector friendly instruction format 600 except where claimed. For example, the generic vector friendly instruction format 500 contemplates a variety of possible sizes for the various fields, while the specific vector friendly instruction format 600 is shown as having fields of specific sizes. By way of specific example, while the data element width field 564 is illustrated as a one bit field in the specific vector friendly instruction format 600, the disclosure is not so limited (that is, the generic vector friendly instruction format 500 contemplates other sizes of the data element width field 564).

The generic vector friendly instruction format 500 includes the following fields listed below in the order illustrated in FIG. 6A.

EVEX Prefix (Bytes 0-3) 602—is encoded in a four-byte form.

Format Field 540 (EVEX Byte 0, bits [7:0])—the first byte (EVEX Byte 0) is the format field 540 and it contains 0x62 (the unique value used for distinguishing the vector friendly instruction format in one embodiment of the disclosure).

The second-fourth bytes (EVEX Bytes 1-3) include a number of bit fields providing specific capability.

REX field 605 (EVEX Byte 1, bits [7-5])—consists of a EVEX.R bit field (EVEX Byte 1, bit [7]—R), EVEX.X bit field (EVEX byte 1, bit [6]—X), and 557BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 510—this is the first part of the REX' field 510 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 615 (EVEX byte 1, bits [3:0]—mmmm)—its content encodes an implied leading opcode byte (0F, 0F 38, or 0F 3).

Data element width field 564 (EVEX byte 2, bit [7]—W)—is represented by the notation EVEX.W. EVEX.W is used to define the granularity (size) of the datatype (either 32-bit data elements or 64-bit data elements).

EVEX.vvvv 620 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 620 encodes the 4 low-order bits of the first source register specifier stored in inverted (1s complement) form. Depending on the instruction, an extra different EVEX bit field is used to extend the specifier size to 32 registers.

EVEX.U 568 Class field (EVEX byte 2, bit [2]—U)—If EVEX.U=0, it indicates class A or EVEX.U0; if EVEX.U=1, it indicates class B or EVEX.U1.

Prefix encoding field 625 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 552 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 554 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 510—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 570 (EVEX byte 3, bits [2:0]—kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 630 (Byte 4) is also known as the opcode byte. Part of the opcode is specified in this field.

MOD R/M Field 640 (Byte 5) includes MOD field 642, Reg field 644, and R/M field 646. As previously described, the MOD field's 642 content distinguishes between memory access and non-memory access operations. The role of Reg field 644 can be summarized to two situations: encoding either the destination register operand or a source register operand, or be treated as an opcode extension and not used to encode any instruction operand. The role of R/M field 646 may include the following: encoding the instruction operand that references a memory address, or encoding either the destination register operand or a source register operand.

Scale, Index, Base (SIB) Byte (Byte 6)—As previously described, the scale field's 550 content is used for memory address generation. SIB.xxx 654 and SIB.bbb 656—the contents of these fields have been previously referred to with regard to the register indexes Xxxx and Bbbb.

Displacement field 562A (Bytes 7-10)—when MOD field 642 contains 10, bytes 7-10 are the displacement field 562A, and it works the same as the legacy 32-bit displacement (disp32) and works at byte granularity.

Displacement factor field 562B (Byte 7)—when MOD field 642 contains 01, byte 7 is the displacement factor field 562B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 562B is a reinterpretation of disp8; when using displacement factor field 562B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 562B substitutes the legacy x86 instruction set 8-bit displacement. Thus, the displacement factor field 562B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 572 operates as previously described.

Full Opcode Field

FIG. 6B is a block diagram illustrating the fields of the specific vector friendly instruction format 600 that make up the full opcode field 574 according to one embodiment of the disclosure. Specifically, the full opcode field 574 includes the format field 540, the base operation field 542, and the data element width (W) field 564. The base operation field 542 includes the prefix encoding field 625, the opcode map field 615, and the real opcode field 630.

Register Index Field

FIG. 6C is a block diagram illustrating the fields of the specific vector friendly instruction format 600 that make up the register index field 544 according to one embodiment of the disclosure. Specifically, the register index field 544 includes the REX field 605, the REX' field 610, the MODR/M.reg field 644, the MODR/M.r/m field 646, the VVVV field 620, xxx field 654, and the bbb field 656.

Augmentation Operation Field

Figure 6D:
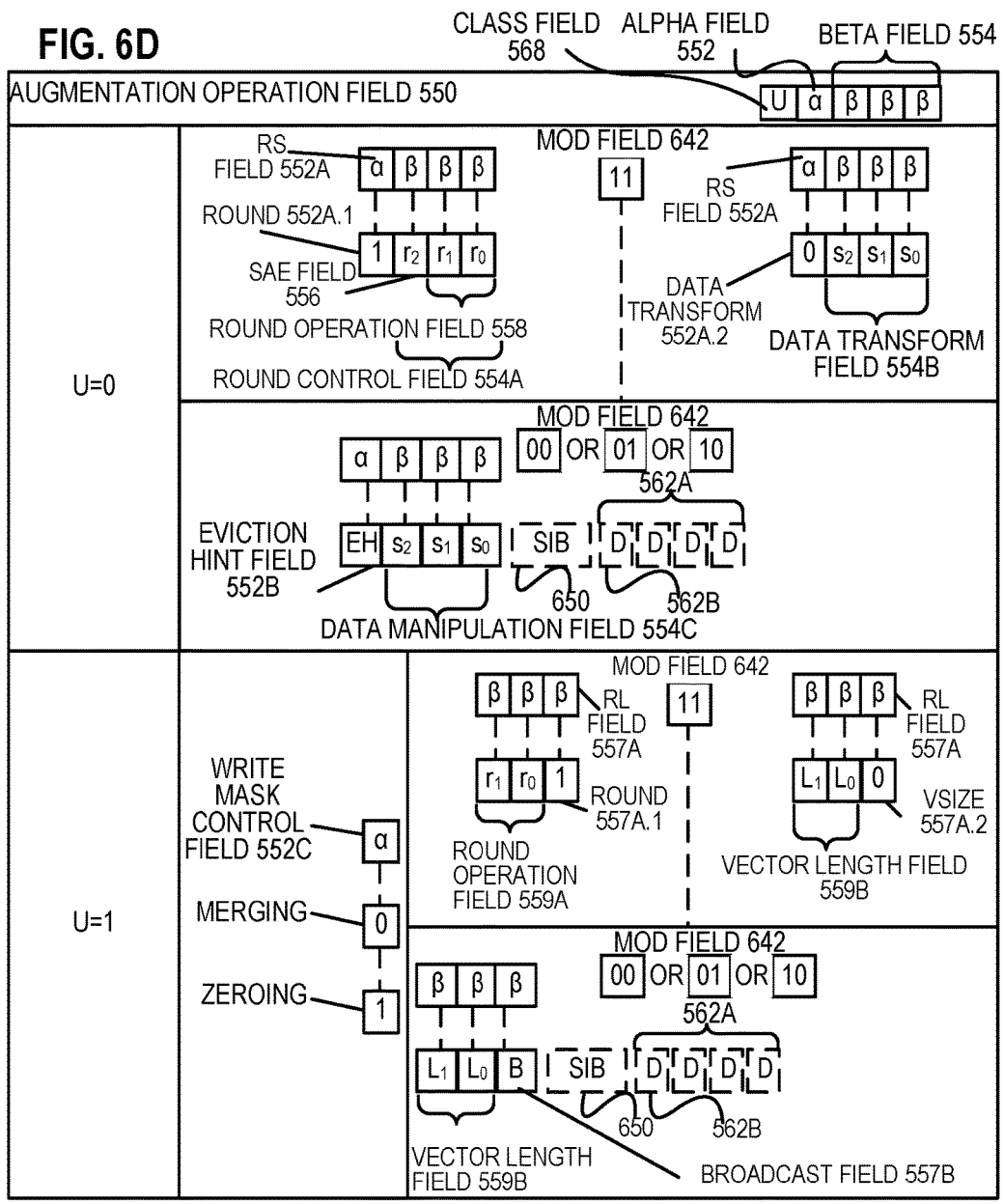
FIG. 6D is a block diagram illustrating the fields of the specific vector friendly instruction format in FIG. 6A that make up the augmentation operation field 550 according to one embodiment of the disclosure.

FIG. 6D is a block diagram illustrating the fields of the specific vector friendly instruction format 600 that make up the augmentation operation field 550 according to one embodiment of the disclosure. When the class (U) field 568 contains 0, it signifies EVEX.U0 (class A 568A); when it contains 1, it signifies EVEX.U1 (class B 568B). When U=0 and the MOD field 642 contains 11 (signifying a no memory access operation), the alpha field 552 (EVEX byte 3, bit [7]—EH) is interpreted as the rs field 552A. When the rs field 552A contains a 1 (round 552A.1), the beta field 554 (EVEX byte 3, bits [6:4]—SSS) is interpreted as the round control field 554A. The round control field 554A includes a one bit SAE field 556 and a two bit round operation field 558. When the rs field 552A contains a 0 (data transform 552A.2), the beta field 554 (EVEX byte 3, bits [6:4]—SSS) is interpreted as a three bit data transform field 554B. When U=0 and the MOD field 642 contains 00, 01, or 10 (signifying a memory access operation), the alpha field 552 (EVEX byte 3, bit [7]—EH) is interpreted as the eviction hint (EH) field 552B and the beta field 554 (EVEX byte 3, bits [6:4]—SSS) is interpreted as a three bit data manipulation field 554C.

When U=1, the alpha field 552 (EVEX byte 3, bit [7]—EH) is interpreted as the write mask control (Z) field 552C. When U=1 and the MOD field 642 contains 11 (signifying a no memory access operation), part of the beta field 554 (EVEX byte 3, bit [4]—$S_0$) is interpreted as the RL field 557A; when it contains a 1 (round 557A.1) the rest of the beta field 554 (EVEX byte 3, bit [6-5]—$S_{2-1}$) is interpreted as the round operation field 559A, while when the RL field 557A contains a 0 (VSIZE 557.A2) the rest of the beta field 554 (EVEX byte 3, bit [6-5]—$S_{2-1}$) is interpreted as the vector length field 559B (EVEX byte 3, bit [6-5]—$L_{1-0}$). When U=1 and the MOD field 642 contains 00, 01, or 10 (signifying a memory access operation), the beta field 554 (EVEX byte 3, bits [6:4]—SSS) is interpreted as the vector length field 559B (EVEX byte 3, bit [6-5]—$L_{1-0}$) and the broadcast field 557B (EVEX byte 3, bit [4]—B).

Exemplary Register Architecture

Figure 7:
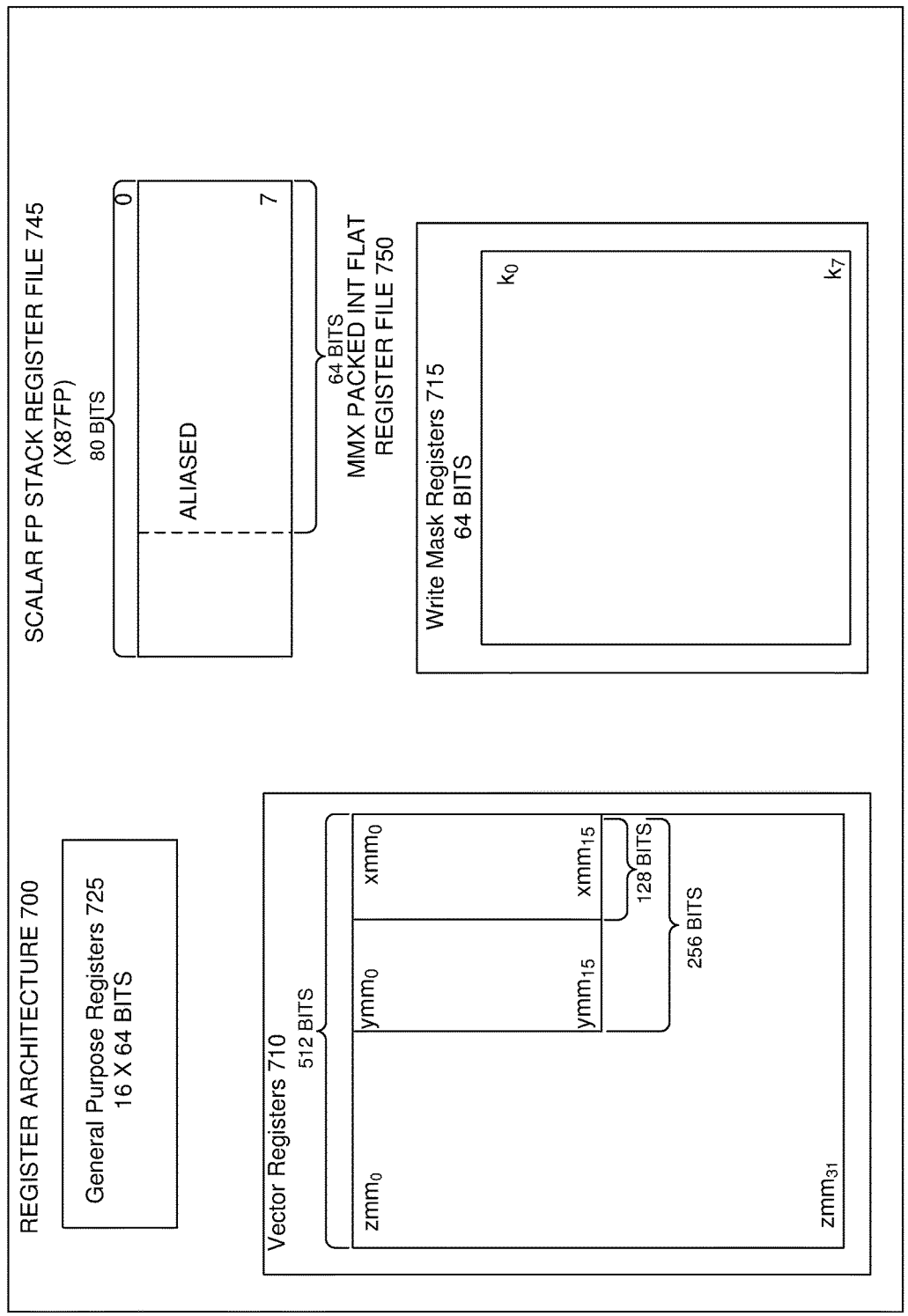
FIG. 7 is a block diagram of a register architecture according to one embodiment of the disclosure

FIG. 7 is a block diagram of a register architecture 700 according to one embodiment of the disclosure. In the embodiment illustrated, there are 32 vector registers 710 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 600 operates on these overlaid register file as illustrated in the below tables.

| Adjustable Vector Length | Class | Operations | Registers |
| --- | --- | --- | --- |
| Instruction Templates that do not include the vector length field 559B | A (FIG. 5A; U = 0) | 510, 515, 525, 530 | zmm registers (the vector length is 64 byte) |
|  | B (FIG. 5B; U = 1) | 512 | zmm registers (the vector length is 64 byte) |
| Instruction templates that do include the vector length field 559B | B (FIG. 5B; U = 1) | 517, 527 | zmm, ymm, or xmm registers (the vector length is 64 byte, 32 byte, or 16 byte) depending on the vector length field 559B |

In other words, the vector length field 559B selects between a maximum length and one or more other shorter lengths, where each such shorter length is half the length of the preceding length; and instructions templates without the vector length field 559B operate on the maximum vector length. Further, in one embodiment, the class B instruction templates of the specific vector friendly instruction format 600 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 715—in the embodiment illustrated, there are 8 write mask registers (k0 through k7), each 64 bits in size. In an alternate embodiment, the write mask registers 715 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 745, on which is aliased the MMX packed integer flat register file 750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 8A is a block diagram illustrating both an exemplary in-order pipeline and an exemplary register renaming, out-of-order issue/execution pipeline according to embodiments of the disclosure. FIG. 8B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the disclosure. In one embodiment, an instruction decode unit 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the disclosure may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the disclosure. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Figure 10:
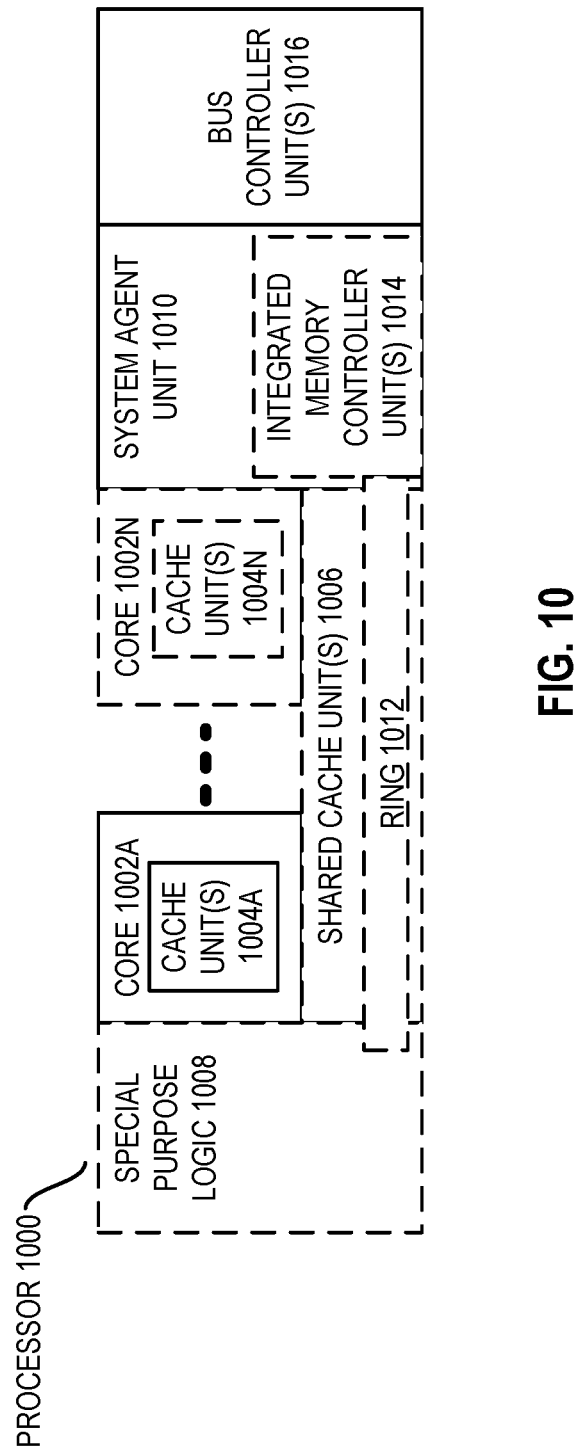
FIG. 10 is a block diagram of a processor that may have more than one core, may have an integrated memory controller, and may have integrated graphics according to embodiments of the disclosure.

FIG. 10 is a block diagram of a processor 1000 that may have more than one core, may have an integrated memory controller, and may have integrated graphics according to embodiments of the disclosure. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
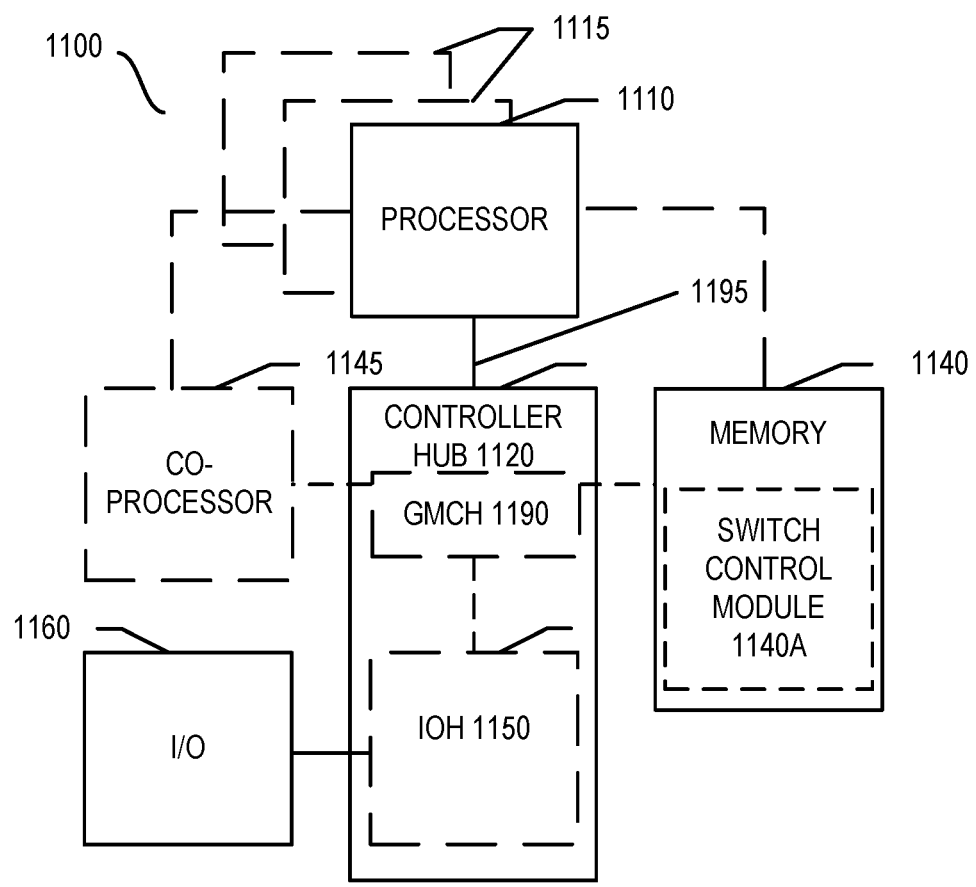
FIG. 11 is a block diagram of a system in accordance with one embodiment of the present disclosure.

Referring now to FIG. 11, shown is a block diagram of a system 1100 in accordance with one embodiment of the present disclosure. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150. Memory 1140 may include a switch control module 1140A (and/or a data hazard resolution module), for example, to store code that when executed causes a processor to perform any method of this disclosure.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
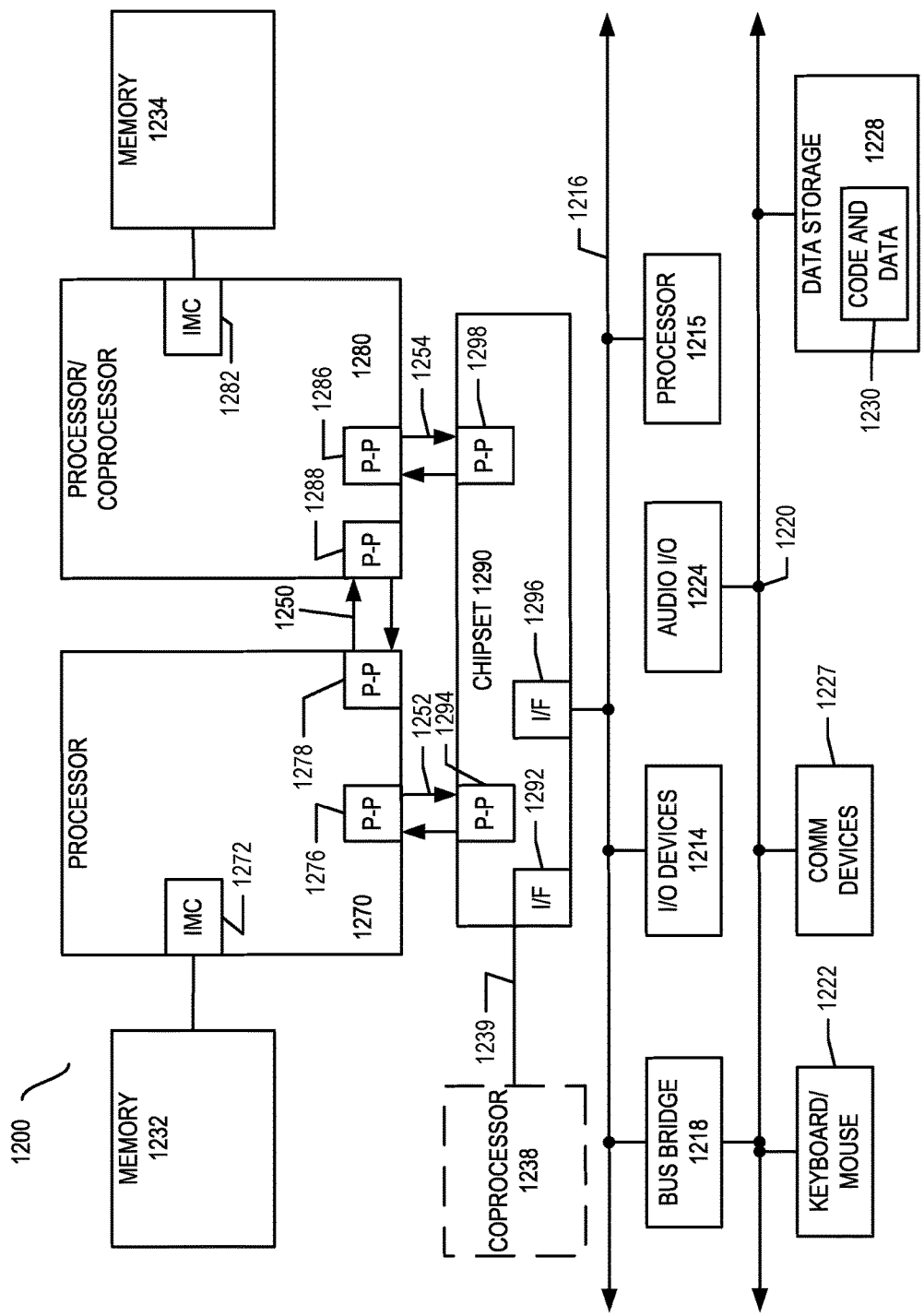
FIG. 12 is a block diagram of a more specific exemplary system in accordance with an embodiment of the present disclosure.

Referring now to FIG. 12, shown is a block diagram of a first more specific exemplary system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the disclosure, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
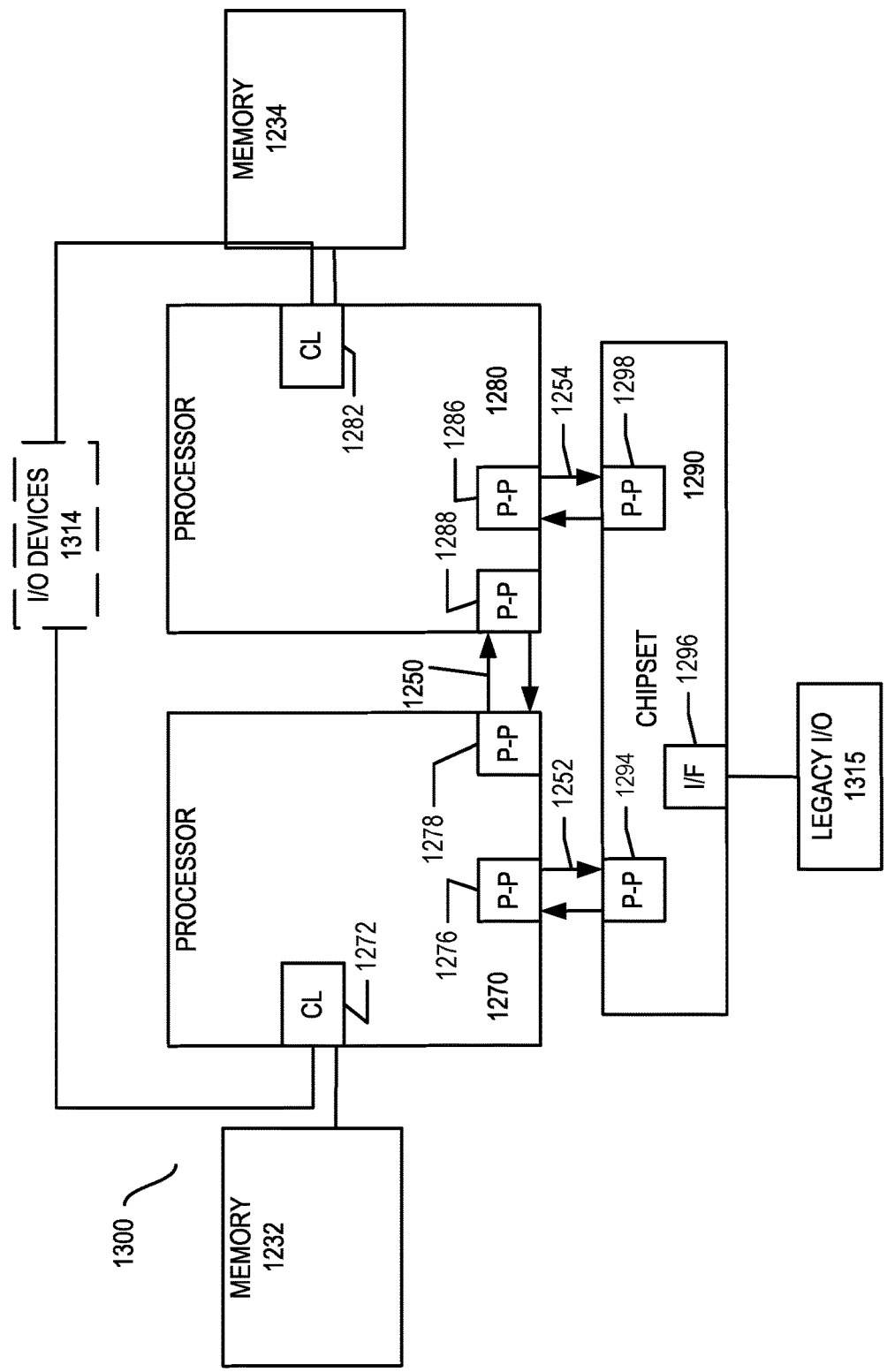
FIG. 13, shown is a block diagram of a second more specific exemplary system in accordance with an embodiment of the present disclosure.

Referring now to FIG. 13, shown is a block diagram of a second more specific exemplary system 1300 in accordance with an embodiment of the present disclosure like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
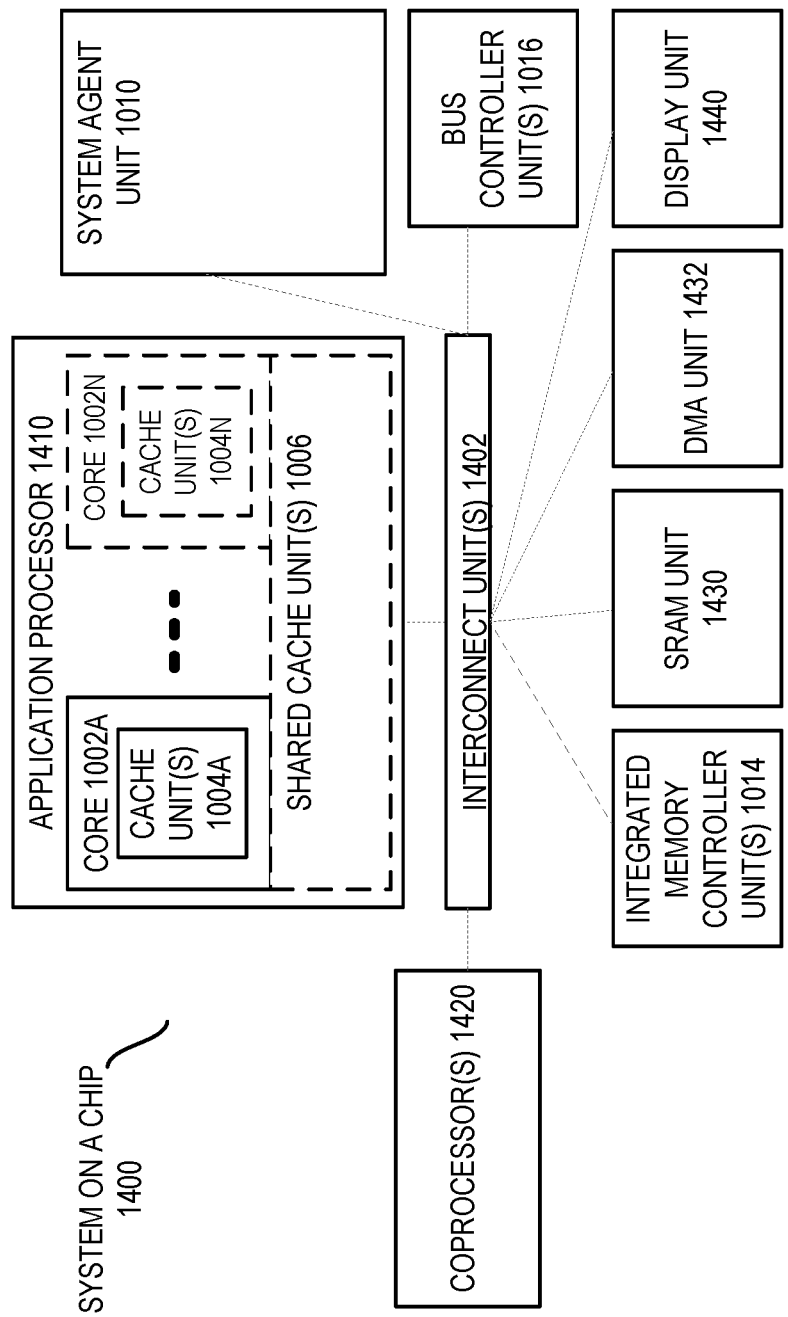
FIG. 14, shown is a block diagram of a system on a chip (SoC) in accordance with an embodiment of the present disclosure.

Referring now to FIG. 14, shown is a block diagram of a SoC 1400 in accordance with an embodiment of the present disclosure. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

What is claimed is:

1. An apparatus comprising:
a plurality of execution units;
at least one switch to:
connect parallel inputs of the plurality of execution units to an output of a first buffer and parallel outputs of a plurality of memory banks based on a first control value, and
connect parallel inputs of the plurality of memory banks and parallel inputs of a plurality of second buffers to an output of the first buffer, the parallel outputs of the plurality of memory banks, and parallel outputs of the plurality of execution units based on a second control value; and
an offload engine with parallel inputs connected to respective, parallel outputs of the plurality of second buffers.

2. The apparatus of claim 1, wherein an output of the offload engine connects to an input of the first buffer.

3. The apparatus of claim 2, wherein the offload engine simultaneously writes to the input of the first buffer and reads from the parallel inputs of the plurality of second buffers.

4. The apparatus of claim 3, wherein data hazard resolution logic circuitry is to not insert a stall.

5. The apparatus of claim 1, wherein the plurality of execution units are to execute at a first clock speed and the offload engine is to execute at a second, slower clock speed.

6. The apparatus of claim 1, wherein the plurality of execution units each includes a shift register.

7. The apparatus of claim 1, wherein the first buffer and the plurality of second buffers are first in first out (FIFO) buffers.

8. The apparatus of claim 1, wherein the plurality of memory banks are four or more memory banks and each memory bank includes an input port and an output port separate from input ports and output ports of the other memory banks.

9. A method comprising:
- connecting parallel inputs of a plurality of execution units of a hardware processor to an output of a first buffer and parallel outputs of a plurality of memory banks based on a first control value;
- connecting parallel inputs of the plurality of memory banks and parallel inputs of a plurality of second buffers to an output of the first buffer, the parallel outputs of the plurality of memory banks, and parallel outputs of the plurality of execution units based on a second control value; and
- providing data to parallel inputs of an offload engine from respective, parallel outputs of the plurality of second buffers.

10. The method of claim 9, further comprising providing data from an output of the offload engine to an input of the first buffer.

11. The method of claim 10, further comprising simultaneously reading writing to the input of the first buffer and reading from the parallel inputs of the plurality of second buffers by the offload engine.

12. The method of claim 11, further comprising not inserting a stall.

13. The method of claim 9, further comprising the plurality of execution units executing at a first clock speed and the offload engine executing at a second, slower clock speed.

14. The method of claim 9, wherein the plurality of execution units each includes a shift register.

15. The method of claim 9, wherein the plurality of memory banks are four or more memory banks and each memory bank includes an input port and an output port separate from input ports and output ports of the other memory banks.

16. The method of claim 9, wherein the first buffer and the plurality of second buffers are first in first out (FIFO) buffers.

17. A hardware processor comprising:
- a hardware decoder to decode an instruction into a decoded instruction;
- a hardware execution unit to execute the decoded instruction to:
  - connect parallel inputs of a plurality of execution units of a hardware processor to an output of a first buffer and parallel outputs of a plurality of memory banks based on a first field of the instruction;
  - connect parallel inputs of the plurality of memory banks and parallel inputs of a plurality of second buffers to an output of the first buffer, the parallel outputs of the plurality of memory banks, and parallel outputs of the plurality of execution units based on a second field of the instruction; and
  - provide data to parallel inputs of an offload engine from respective, parallel outputs of the plurality of second buffers.

18. The hardware processor of claim 17, wherein an output of the offload engine connects to an input of the first buffer.

19. The hardware processor of claim 18, wherein the hardware execution unit is to execute the instruction to cause a simultaneous write to the input of the first buffer and reads from the parallel inputs of the plurality of second buffers.

20. The hardware processor of claim 19, wherein the hardware execution unit is to execute the instruction without inserting a stall.

21. The hardware processor of claim 17, wherein the plurality of execution units are to execute at a first clock speed and the offload engine is to execute at a second, slower clock speed.

22. The hardware processor of claim 17, wherein the plurality of execution units each includes a shift register.

23. The hardware processor of claim 17, wherein the first buffer and the plurality of second buffers are first in first out (FIFO) buffers.

24. The hardware processor of claim 17, wherein the plurality of memory banks are four or more memory banks and each memory bank includes an input port and an output port separate from input ports and output ports of the other memory banks.

* * * * *